(12) United States Patent
Richards

(10) Patent No.: US 8,664,331 B2
(45) Date of Patent: Mar. 4, 2014

(54) AQUEOUS URETHANE DISPERSANTS

(75) Inventor: Stuart Nicholas Richards, Manchester (GB)

(73) Assignee: The Lubrizol Corporation, Wickliffe, OH (US)

(*) Notice: Subject to any disclaimer, the term of this patent is extended or adjusted under 35 U.S.C. 154(b) by 264 days.

(21) Appl. No.: 10/496,389

(22) PCT Filed: Nov. 1, 2002

(86) PCT No.: PCT/GB02/04950
§ 371 (c)(1),
(2), (4) Date: May 24, 2004

(87) PCT Pub. No.: WO03/046038
PCT Pub. Date: Jun. 5, 2003

(65) Prior Publication Data
US 2004/0260013 A1    Dec. 23, 2004

(30) Foreign Application Priority Data
Nov. 24, 2001  (GB) .................................. 0128221.9

(51) Int. Cl.
| | |
|---|---|
| *B41J 2/00* | (2006.01) |
| *B41J 2/01* | (2006.01) |
| *B41J 2/175* | (2006.01) |
| *C08G 18/00* | (2006.01) |
| *C08G 18/08* | (2006.01) |
| *C08G 18/28* | (2006.01) |
| *C08J 3/00* | (2006.01) |
| *C08J 3/20* | (2006.01) |
| *C08L 75/00* | (2006.01) |

(52) U.S. Cl.
USPC ................ 524/590; 347/1; 347/86; 347/110; 523/160; 523/161; 524/589; 524/591; 524/839; 524/840; 528/44; 528/65; 528/85

(58) Field of Classification Search
USPC ............ 524/589, 590, 591, 839, 840; 528/44, 528/65, 85; 347/1, 110, 86; 523/1, 160, 523/161, 60
See application file for complete search history.

(56) References Cited

U.S. PATENT DOCUMENTS

| | | | | |
|---|---|---|---|---|
| 3,905,929 | A | * | 9/1975 | Noll ............................... 524/839 |
| 3,920,598 | A | * | 11/1975 | Reiff et al. ...................... 524/871 |
| 4,147,679 | A | * | 4/1979 | Scriven et al. ................. 523/404 |
| 4,764,553 | A | * | 8/1988 | Mosbach et al. .............. 524/591 |
| 5,969,002 | A | | 10/1999 | Kijlstra et al. ................. 523/160 |
| 6,130,309 | A | | 10/2000 | Reich et al. ..................... 528/76 |

FOREIGN PATENT DOCUMENTS

EP        0317258 B1    5/1989

OTHER PUBLICATIONS

Drott et al., "Determination of Polymer Branching with Gel-Permeation Chromatography. I. Theory", Journal of Polymer Science: Part A-2, vol. 8, pp. 1361-1371, 1970.*

* cited by examiner

*Primary Examiner* — Patrick Niland
(74) *Attorney, Agent, or Firm* — Samuel B. Laferty

(57) ABSTRACT

A polyurethane polymer comprising from 35% to 90% ($^w/_w$) of a poly ($C_{2-4}$-alkylene oxide) based on the total weight of the polymer wherein not less than 60% by weight of the poly ($C_{2-4}$-alkylene oxide) is polyethylene oxide and wherein at least 5% of the poly ($C_{2-4}$-alkylene oxide) based on the total weight of the polymer is incorporated in lateral chains and which contains 10 to 180 milliequivalents of add groups for each 100 gm polymer when the polyurethane contains from 35 to 45% by weight poly ($C_{2-4}$-alkylene oxide), e.g. a polymer made by reacting dimethylolpropionic acid, cyclohexane dimethanol, polypropylene glycol (1000), N-methyl pyrrolidone and an α,α-diydroxy polyethylene glycol obtainable from 2,4-toluene diisocyanate, methoxy polyethylene glycol (750) and diethanolamine.

24 Claims, No Drawings

AQUEOUS URETHANE DISPERSANTS

The present invention relates to polyurethane dispersants, to dispersions, millbases, paints and inks containing a particulate solid which is dispersed in an aqueous medium, including inks for use in non-contact printing processes such as "Drop-on-demand" printing processes.

There are a large number of patent specifications which disclose water-soluble or water-dispersible polyurethane polymers which contain poly (ethylene oxide) chain segments which may be present in lateral or terminal chains attached to a polyurethane backbone. Typically, these specifications relate to polymer stabilisation in aqueous media and to the use of such polymers in the coating industry. One example of such specifications is U.S. Pat. No. 4,764,533 which discloses a water-soluble or dispersible polyurethane containing about 0.5 to 30% by weight, based on the total weight of the polyurethane, of ethylene oxide units present in lateral or terminal polyether chains and 0.1 to 120 milliequivalents per 100 gm of the polyurethane, of carboxylic acid groups. There is no suggestion that these polyurethane polymers may be used to disperse pigments in aqueous media.

U.S. Pat. No. 4,794,147 discloses two types of polyether containing polyurethane resins one of which is a laterally stabilised polyurethane containing composition and the other relates to a terminally stabilised polyurethane coating composition. The object of the invention is stated to be the provision of water-dispersible resins without incorporating salt-forming groups into the resins. There is no suggestion that the resins contain both lateral and terminal polyether chains and in the case of lateral polyether chains none of the examples contain more than 10% by weight of ethylene oxide units.

Patent specifications which disclose the use of polyurethane dispersants for dispersing pigments in aqueous media have appeared more recently for inkjet printing. Thus U.S. Pat. No. 5,969,002 discloses a water soluble polyurethane having hydrophilic polyether chains and an isocyanate group content of not more than 1.0% by weight containing 30 to 95% by weight of ethylene oxide units arranged within polyether chains and incorporated via monofunctional alcohols and also having an anionic group content of 0 to 200 milliequivalents per 100 gram polyisocyanate addition product. The isocyanates have a functionality of 1.7 to 6 although a preferred functionality is from 3.0 to 6.0. Since the polyether chains are incorporated within monofunctional alcohols these chains are terminally attached to the polyurethane backbone. A similar disclosure is U.S. Pat. No. 6,136,890 where the polyurethane dispersant contains a group with up to 11% by weight of monovalent polyethylene oxide units.

It has now been found that superior dispersants may be obtained where the polyurethane contains a large amount of ethylene oxide repeat units in lateral chains attached to a polyurethane backbone. Examples of improved properties are higher pigment loading at equivalent millbase viscosity and improved functional properties such as gloss, colour strength or, in the case of black pigments, "jetness" when the pigment dispersion or millbase is incorporated into a paint film.

According to the invention there is provided a polyurethane polymer comprising from 35 to 90% by weight of poly ($C_{2-4}$-alkylene oxide) based on the total weight of the polyurethane polymer wherein not less than 60% by weight of the poly ($C_{2-4}$-alkylene oxide) is poly (ethylene oxide) and wherein at least 5% by weight of the poly ($C_{2-4}$-alkylene oxide) based on the weight of the polyurethane polymer is incorporated in lateral chains and which contains from 10 to 180 milliequivalents of acid groups for each 100 gms polyurethane when the polyurethane polymer contains from 35 to 45% by weight poly(alkylene oxide).

When the polyurethane polymer contains not less than 45% by weight of poly (alkylene oxide) it is also preferred that it contains from 10 to 180 milliequivalents of acid groups for each 100 gm polyurethane polymer.

Preferably at least 10%, more preferably at least 20% and especially at least 30% of the poly ($C_{2-4}$-alkylene oxide) based on the weight of the polyurethane polymer is incorporated in lateral chains.

It is also preferable that the acid groups in the polyurethane polymers are carboxylic acid groups.

The polyurethane polymer essentially comprises a linear backbone containing lateral poly (alkylene oxide) chains and optionally carboxylic acid groups. The polyurethane chains may also optionally carry terminal poly ($C_{2-4}$-alkylene oxide) chains. The polyurethane backbone is more hydrophobic in character than the lateral poly (alkylene oxide) chains. Without being bound to any specific mechanism involving the dispersion of particulate solids such as pigments in aqueous media it is thought that the relatively hydrophobic backbone of the polyurethane polymer interacts with the surface of the particulate solid and that the lateral poly (alkylene oxide) chains stabilise the coated particulate solid in the aqueous medium.

Whereas some degree of branching of the polyurethane backbone may be tolerated such branching should not lead to cross-linked matrices which impair the ability of the polyurethane polymer to disperse the particulate solid throughout the aqueous medium.

Preferably, the amount of poly ($C_{2-4}$-alkylene oxide) is not less than 40% and especially not less than 50% based on the total weight of the polyurethane polymer. It is also preferred that the amount of poly ($C_{2-4}$-alkylene oxide) is not greater than 80% and especially not greater than 70% based on the total weight of the polyurethane polymer.

The amount of poly (ethylene oxide) in the poly ($C_{2-4}$-alkylene oxide) which is located in the lateral and terminal chains, if present, of the polyurethane polymer is preferably not less than 70% and especially not less than 80% of the poly ($C_{2-4}$-alkylene oxide).

When the poly (alkylene oxide) chains contain repeat units other than ethyleneoxy, these may be propyleneoxy or butyleneoxy which may be arranged in random or block sequences.

Preferably the polyurethane polymer is unbranched.

The number average molecular weight of the poly (alkylene oxide) chains which are laterally or terminally attached to the polyurethane backbone is preferably not greater than 5,000, more preferably not greater than 3,000 and especially not greater than 2,500. The molecular weight of the poly (alkylene oxide) chain is also preferably not less than 350 and especially not less than 600. Good dispersants have been obtained where the number average molecular weight of the poly (alkylene oxide) chain is in the range of 350 to 2,500.

The amount of acid groups in the polyurethane polymer is preferably not greater than 110, more preferably not greater than 75 and especially not greater than 60 milliequivalents for each 100 gm of the polyurethane polymer. It is also preferred that the amount of carboxylic acid groups is not less than 20 milliequivalents for each 100 gm of polyurethane polymer. The acid groups may be present as the free acid or in the form of a salt. Preferably the salt is that of an alkali metal cation such as potassium, lithium or sodium, ammonia, amine or quaternary ammonium cation, including mixtures thereof. Examples of suitable amines are ethanolamine, diethanolamine and triethylamine. Examples of suitable quaternary ammonium salts are the $C_{1-8}$ alkyl quaternary ammonium salts. It is preferred that the acid is present as the salt of ammonia or other volatile amine.

The polyurethane polymers are obtainable by reacting together:

a) one or more poly isocyanates having an average functionality of from 2.0 to 2.5;

b) one or more compounds having at least one poly ($C_{2-4}$-alkylene oxide) chain and at least two groups which react with isocyanates which are located at the one end of the compound such that the poly ($C_{2-4}$-alkylene oxide) chain(s) is laterally disposed in relation to the polyurethane polymer backbone;

c) optionally, one or more compounds having at least one acid group and at least two groups which react with isocyanates;

d) optionally, one of more formative compounds having a number average molecular weight of from 32 to 3,000 which have at least two groups which react with isocyanates;

e) optionally, one or more compounds which act as chain terminators which contain one group which reacts with isocyanate groups.

f) optionally, one or more compounds which act as chain terminators which contain a single isocyanate group.

Preferably component (c) is a compound having one acid group.

As noted hereinbefore the polyurethane polymers according to the invention are essentially linear in character with respect to the polymer backbone. It is therefore preferred that the isocyanate which is component (a) has an average functionality of from 2.0 to 2.1. Examples of isocyanates are diisocyanates such as toluene diisocyanate (TDI), isophorone diisocyanate (IPDI), hexanediisocyanate (HDI), α,α'-tetramethylxylene diisocyanate (TMXDI), diphenylmethane-4,4'-diisocyanate (MDI) and dicyclohexylmethane-4,4'-diisocyanate (HMDI). Preferred diisocyanates are TDI, IPDI and HMDI.

The compound having a poly (alkylene oxide) chain which is component (b) preferably contains two groups which react with isocyanates. There are a number of ways of incorporating a poly (alkylene oxide) lateral chain into an organic compound which contains these groups which react with isocyanates.

Thus, in the case where the two groups which react with isocyanates are both hydroxyl, the poly ($C_{2-4}$-alkylene oxide) chain may be conveniently attached by isocyanates having a functionality of two or more. Compounds of this type are described in U.S. Pat. No. 4,794,147 which involves sequentially reacting a mono-functional polyether with a polyisocyanate to produce a partially capped isocyanate intermediate and reacting the intermediate with a compound having at least one active amino hydrogen and at least two active hydroxyl groups.

One preferred class of compound of this type may be presented by the formula 1.

wherein
R is $C_{1-20}$-hydrocarbyl;
$R^1$ is hydrogen, methyl or ethyl of which not less than 60% is hydrogen;
$R^2$ and $R^3$ are each, independently, $C_{1-8}$-hydroxyalkyl;
Z is $C_{2-4}$-alkylene;
X is —O— or —NH—;
Y is the residue of a polyisocyanate;
m is from 5 to 150;
p is from 1 to 4; and
q is 1 or 2.

R may be alkyl, aralkyl, cycloalkyl or aryl.

When R is aralkyl, it is preferably benzyl or 2-phenylethyl.

When R is cycloalkyl it is preferably $C_{3-8}$-cycloalkyl such as cyclohexyl.

When R is aryl it is preferably naphthyl or phenyl.

When R is alkyl, it may be linear or branched and preferably contains not greater than 12, more preferably not greater than 8 and especially not greater than 4 carbon atoms. It is especially preferred that R is methyl.

The $C_{2-4}$-alkylene radical represented by Z may be ethylene, trimethylene, 1,2-propylene or butylene.

Preferably m is not less than 10. It is also preferred that m is not greater than 100 and especially not greater than 80.

When q is 2 it is possible to link two different polyurethane polymer chains but it is much preferred that q is 1.

When the polyisocyanate has a functionality which is greater than 2, the compound which is component (b) may carry more than one poly (alkylene oxide) chain. However, it is much preferred that p is 1, q is 1 and that Y is the residue of a diisocyanate.

When $R^1$ is hydrogen and Z is ethylene and X is —O— the compound of formula 1 is a derivative of a mono-functional polyether such as polyethylene glycol monoalkyl ether.

When $R^1$ is hydrogen or a mixture of hydrogen and methyl and Z is 1,2-propylene and X is —NH— the compound of formula 1 is a derivative of polyalkylene glycol amine such as a Jeffamine M polyether available from Huntsman Corporation.

Preferably, $R^3$ and $R^4$ are both 2-hydroxyethyl.

It is also preferred that X is O.

Compounds of formula 1 are typically prepared by reacting a mono-functional polyether with a polyisocyanate in an inert solvent such as toluene at a temperature of from 50 to 100° C. and preferably in the presence of an acid catalyst until the derived isocyanate value is reached. The temperature is then normally reduced to between 40 and 60° C. when the requisite secondary amine such as diethanolamine is added.

Useful compounds of formula 1 have been used as component (b) by reacting a poly (ethylene glycol) mono methyl ether or a Jeffamine M series polyether having a number average molecular weight of from 250 to 5,000 with a diisocyanate such as TDI followed by diethanolamine.

A second preferred type of compound which can be used as component (b) is of formula 2.

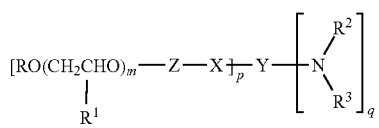

1

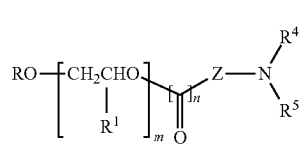

2 wherein
R, R¹, Z and m are as defined hereinbefore;
R⁴ is an isocyanate reactive organic radical;
R⁵ is hydrogen or an isocyanate-reactive organic radical; and
n is 0 or 1.

Compounds of formula 2 are disclosed in EP 317258.

The organic radical represented by R⁴ and R⁵ is an organic radical containing an isocyanate-reactive group, such as —OH, —SH, —COOH, —PO₃H₂ and —NHR⁶ in which R⁶ is hydrogen or optionally substituted alkyl. As specific examples of isocyanate-reactive radicals, there may be mentioned hydroxyalkyl, hydrox alkoxy alkyl, hydroxy (poly alkylene oxy) alkyl and hydroxy alkoxy carbonyl alkyl.

A preferred type of compound of formula 2 is where n is zero, Z is 1,2-propylene, R⁴ is 2-hydroxyethyl and R⁵ is hydrogen. Compounds of this type are obtainable by the Michaels addition reaction of a poly (alkylene oxide) monoalkyl ether monoamine and a hydroxy functional acrylate such as 2-hydroxyethyl acrylate or hydroxypropyl acrylate. A suitable source of poly (alkylene oxide) monoalkyl ether monoamine is the Jeffamine M series of polyethers available from Huntsman Corporation. The reaction between the poly (alkylene oxide) mono alkylether monoamine and 2-hydroxy functional acrylate is typically carried out in the presence of air and at a temperature of 50 to 100° C., optionally in the presence of a polymerisation inhibitor such as hydroquinone or butylated hydroxy toluene.

Another preferred type of compound of formula 2 is where n is zero, Z is 1,2-propylene and R⁴ and R⁵ are both 2-hydroxyethyl. Compounds of this type may be prepared by reacting a poly(alkylene oxide) mono alkyl ether mono amine with ethylene oxide under acidic conditions.

Yet another preferred type of compound of formula 2 is where n is zero, Z is 1,2-propylene and R⁴ is 2-hydroxyethyl and R⁵ is hydrogen. Compounds of this type may be prepared by reacting a poly(alkylene oxide) mono alkyl ether mono amine with about one stoichiometric equivalent of ethylene oxide under acidic conditions.

A third preferred type of compound which may be used as component (b) is of formula 3

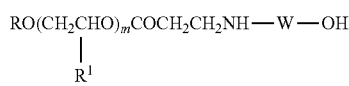

wherein R, R¹ and m are as defined hereinbefore and W is C₂₋₆-alkylene and especially ethylene. Compounds of this type are obtainable by the Michael addition reaction of a hydroxy amine and a poly (alkylene oxide) acrylate.

A fourth preferred type of compound which may be used as component (b) is of formula 4.

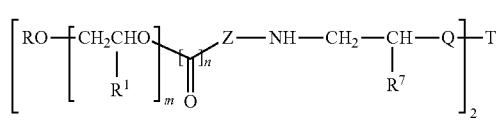

wherein
R, R¹, Z, m and n are as defined hereinbefore;
R⁷ represents hydrogen, halogen or C₁₋₄alkyl;
Q is a divalent electron withdrawing group; and
T is a divalent hydrocarbon radical which may carry substituents or contain hetero atoms.

Examples of electron withdrawing groups which may be represented by Q include —CO—, —COO—, —SO—, —SO₂—, —SO₂O— and —CONR⁸— in which R⁸ is hydrogen or alkyl.

Hydrocarbon radicals which may be represented by T include alkylene, arylene and mixtures thereof, said radicals optionally carrying substituents or containing hetero-atoms. Examples of suitable radicals represented by T are alkylene radicals containing from 1 to 12 carbon atoms, oxyalkylene and polyoxyalkylene radicals of the formula —(CH₂CHR¹O)ₓ wherein R¹ is as defined hereinbefore and x is from 1 to 10, phenylene and diphenylene radicals and other arylene radicals such as

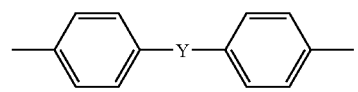

wherein Y is —O—, —S—, —CH₂—, —CO— or —SO₂—

The compounds of Formula 4 are obtainable by the Michael addition reaction of two moles of a poly (alkylene oxide) monoalkyl ether monoamine with one mole of an unsaturated compound of the formula 5.

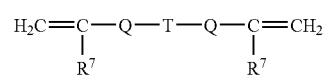

wherein Q, T and R⁷ are as defined hereinbefore.

Examples of unsaturated compounds of Formula 5 are especially diacrylates and dimethacrylates wherein T is a C₄₋₁₀-alkylene residue, a polyoxyalkylene residue or an oxyethylated Bisphenol A residue.

A fifth preferred type of compound which may be used as component (b) is a compound of formula 6.

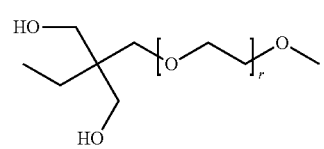

wherein
r is from 4 to 100.

Preferably, r is not less than 10 and especially not less than 15. It is also preferred that r is not greater than 80, more preferably not greater than 60 and especially not greater than 40.

A specific example is Tegomer D 3403 (p is approximately 20) ex Tego Chemie.

As disclosed hereinbefore, the acid compound which is component (c) of the polyurethane polymer is preferably a carboxylic acid. It is also preferred that component (c) is a diol and is especially a compound of formula 7.

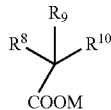

wherein at least two of the groups $R^8$, $R^9$ and $R^{10}$ are $C_{1-6}$-hydroxy alkyl and the remainder is $C_{1-6}$-hydrocarbyl, which may be linear or branched alkyl, aryl, aralkyl or cycloalkyl, M is hydrogen or an alkaline metal cation, or quaternary ammonium cation. Preferred examples of carboxylic acid components are dimethylolpropionic acid (DMPA) and dimethylolbutyric acid (DMBA).

The acid containing compound which is component (c) may contain other acid groups in addition to or instead of a carboxylic group(s), such as phosphonic or sulphonic acid groups. Examples of such compounds are 1,3-benzene dicarboxylic acid-5-sulpho-1,3-bis (2-hydroxyethyl) ester (EGS-SIPA) and a compound of formula

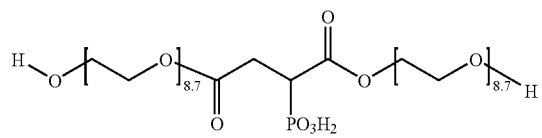

which is ITC 1081 ex Albright and Wilson.

The formative compounds which are component (d) of the polyurethane are preferably difunctional in respect of reactivity with isocyanates although a small amount of higher functionality may be used where a small amount of branching of the polyurethane polymer backbone is desired. However, it is preferred that component (d) is difunctional. Preferred reactive groups are amino and hydroxy and it is much preferred that component (d) is a diamine or especially a diol. Component (d), if present, is used primarily as a chain extender to alter the hydrophilic/hydrophobic balance of the polyurethane polymer. It is much preferred that the polyurethane backbone is more hydrophobic than the lateral side chains and terminal side chains (when present). Component (d) optionally contains other amine moieties such as aliphatic tertiary amine, aromatic amine or cyclo aliphatic amine groups, including mixtures thereof.

Examples of suitable diamines are ethylene diamine, 1,4-butane diamine and 1,6-hexane diamine.

Examples of suitable diols are 1,6-hexanediol, 1,4-cyclohexanedimethanol (CHDM), 1,2-dodecane diol, 2-phenyl-1,2-propanediol, 1,4-benzene dimethanol, 1,4-butanediol and neopentyl glycol. The diol may also be a polyether such as a poly ($C_{2-4}$-alkylene glycol). The polyalkylene glycol may be a random or block (co)polymer containing repeat ethyleneoxy, propyleneoxy or butyleneoxy groups, including mixtures thereof. As noted hereinbefore, it is preferred that the polyurethane backbone is more hydrophobic than the lateral or terminal chains (when present). Consequently, in the case of copolymers involving ethylene oxide repeat units in component (d) it is preferred that the amount of ethylene oxide in component d is not greater than 40%, more preferably not greater than 20% and especially not greater than 10% by weight of the copolymer. It is particularly preferred that polyalkylene glycol is free from ethyleneoxide repeat units.

As noted hereinbefore, it is preferred that the polyurethane polymer backbone is essentially linear in character. However, some small amount of branching may be tolerated and this branching may conveniently be introduced by means of a higher functional polyol such as timethylol propane, trimethylolethane or pentaerythritol.

As disclosed hereinbefore the chain terminating compound which is component (e) is mono-functional with respect to the isocyanate. The monofunctional group is preferably an amino or hydroxy group. Preferred terminating groups are poly ($C_{2-4}$-alkylene) mono alkyl ethers and mono alkyl ether amines similar to those used in the preparation of the lateral side chain compounds which are component (b) of the polyurethane.

An example of a monoisocyanate which acts as a chain terminating compound (component f) is phenyl Isocyanate.

It is much preferred that the amount of component (f) is zero.

Typical amounts of the aforementioned compounds from which the polyurethane polymers are obtainable are 15-50% component (a), 10-80% component (b), 0-24% component (c), 0-25% component (d), 0-50% component (e) and 0-20% component (f), all based on the total weight of the polyurethane polymer.

When component (e) is a monofunctional polyether, the total amount of component (b) with component (e) is preferably not less than 35% and where component (e) is other than a monofunctional polyether the amount of component (b) is preferably not less than 35%.

The polyurethane polymers according to the invention may be prepared by any method known to the art. Typically, the polyurethane polymer is obtainable by reacting one or more isocyanates having a functionality of from 2.0 to 2.5 (component (a)) with one or more compounds having a poly ($C_{2-4}$-alkylene oxide) chain and at least two groups which react with isocyanates which are located at one end (component (b)) under substantially anhydrous conditions and in an inert atmosphere at a temperature between 30 and 130° C., optionally in the presence of an inert solvent and optionally in the presence of a catalyst. Optionally, the reaction may also be carried out in the presence of one or more compounds having at least one acid group (component (c)) and one or more formative compounds acting as chain extenders (component (d)) and optionally one or more compounds which act as chain terminating compounds which are components (e) and (f).

The inert atmosphere may be provided by any of the inert gases of the Periodic Table but is preferably nitrogen.

The preparation of the polyurethane polymer/prepolymer may be carried out in the presence of a catalyst. Particularly preferred catalysts are tin complexes of aliphatic acids such as dibutyl tin dilaurate (DBTDL) and tertiary amines.

The essential feature of the polyurethane polymer according to the invention is that it comprises a predominantly linear polyurethane polymer backbone containing the defined amount of lateral poly (alkylene oxide) side chains. There will thus be many variants which will be obvious to the skilled addressee regarding the ratio of isocyanate groups to isocyanate reactive groups including the formulation of prepolymers which have residual isocyanate functionality. In one case, the ratio of total isocyanate groups provided by component (a) is less than the total number of isocyanate reactive groups provided by component (b) and components (c) (d) and (e) when present. Any terminal isocyanate reactive groups may be reacted.

Alternatively, the ratio of total number of isocyanate groups provided by component (a) and optionally component (f) is greater that the total number of isocyanate reactive groups provided by component (b) and components (c), (d) and (e) when present. The resultant polyurethane is then a prepolymer containing residual isocyanate functionality. This prepolymer may then be reacted with other chain extenders such as component (d) which conjoin different prepolymer chains and/or with chain terminating compounds which are component (e) either prior to or during dissolution in water or other polar solvent.

The preparation of prepolymers can be useful since it is a means of controlling viscosity during the preparation of the polyurethane polymer, especially in circumstances where the reaction is carried out in the absence of any solvent.

When a prepolymer is formed which contains isocyanate functionality, chain extension may be carried out by water itself, or a polyol, amino-alcohol, a primary or secondary aliphatic, alicyclic, aromatic, araliphatic or heterocyclic polyamine especially a diamine, hydrazine or a substituted hydrazine. Water-soluble chain extenders are preferred.

Examples of suitable chain extenders include ethylenediamine, diethylene triamine, triethylene tetramine, propylenediamine, butylenediamine, hexamethylenediamine, cyclohexylenediamine, piperazine, 2-methyl piperazine, phenylenediamine, tolylene diamine, xylylene diamine, tris (2-aminoethy)amine, 3,3'-dinitrobenzidine, 4,4'methylenebis (2-chloraniline), 3,3'-dichloro-4,4'bi-phenyl diamine, 2,6-diaminopyridine, 4,4'-diaminodiphenylmethane, methane diamine, m-xylene diamine, isophorone diamine, and adducts of diethylene triamine with acrylate or its hydrolyzed products. Also materials such as hydrazine, azines such as acetone azine, substituted hydrazines such as, for example, dimethyl hydrazine, 1,6-hexamethylene-bis-hydrazine, carbodihydreazine, hydrazides of dicarboxylic acids and sulphonic acid such as adipic acid mono- or dihydrazide, xalic acid dihydrazide, isophthalic acid dihydrazide, tartaric acid dihydrazide, 1,3-phenylene disulphonic acid dihydrazide, omega-aminocaproic acid dihydrazide, hydrazides made by reacting lactones with hydrazide such as gamma-hydroxylbutyric hydrazide, bis-semi-carbazide carbonic esters of glycols such as any of the glycols mentioned above.

Where the chain extender is other than water, for example, a diamine or hydrazine, it may be added to an aqueous dispersion of prepolymer or, alternatively, it may already be present in an aqueous medium other than that in which the prepolymer is dispersed/dissolved.

The chain extension can be conducted at elevated, reduced or ambient temperatures. Convenient temperatures are from about 5° C. to 95° C.

When employing a prepolymer in the preparation of the polyurethane polymer, the amount of chain extender and chain terminating compound are chosen to control the molecular weight of the polyurethane polymer. A high molecular weight will be favoured when the number of isocyanate-reactive groups in the chain extender is approximately equivalent to the number of free isocyanate groups in the prepolymer. A lower molecular weight of the polyurethane polymer is favoured by using a combination of chain extender and chain terminator in the reaction with the polyurethane prepolymer.

An inert solvent may be added before, during or after formation of the polyurethane polymer/prepolymer in order to control viscocity. Examples of suitable solvents are acetone, methylethylketone, dimethylformamide, dimethylacetamide, diglyme, N-methylprrolidone, ethylacetate, ethylene and propylene glycoldiacetates, alkyl ethers of ethylene and propylene glycol acetates, toluene, xylene and sterically hindered alcohols such as t-butanol and diacetone alcohol. Preferred solvents are acetone, methyl ethylketone and N-methylpyrrolidone.

The number average molecular weight of the polyurethane polymer is preferably not less than 2,000, more preferably not less than 3,000 and especially not less than 4,000. It is also preferred that the number average molecular weight of the polyurethane polymer is not greater than 50,000, more preferably not greater than 20,000 and especially not greater than 15,000.

The polyurethane polymer according to the invention is used as a dispersant for uniformly distributing a particulate solid in a polar media and preferably in a predominantly aqueous media. Hence, it is much preferred that the polyurethane is prepared in the absence of any inert solvent. Where a solvent is required it is preferably volatile such as acetone in order to facilitate its removal by evaporation.

As disclosed hereinbefore, the polyurethane dispersants according to the invention are of use of for dispersing a particulate solid in a polar liquid medium, such as water. Although there are many references to aqueous polyurethane dispersions these refer to polyurethanes which are often used as the principal film-forming polymer for a variety of applications such as coatings, inks and adhesives. The dispersions according to the invention preferably comprise a non-polymeric particulate solid, and especially a pigment.

According to a further aspect of the invention there is provided a dispersion comprising a particulate solid, a polar liquid and a polyurethane polymer as described hereinbefore. Preferably the particulate solid is other than a polyurethane polymer. The polar liquid preferably comprises hydroxy functional solvents such as alcohols and glycols. It is especially preferred that the polar liquid is water.

The solid present in the dispersion may be any inorganic or organic solid material which is substantially insoluble in the polar liquid at the temperature concerned and which it is desired to stabilise in a finely divided form therein.

Examples of suitable solids are pigments, extenders and fillers for paints and plastics materials; dyes, especially disperse dyes; optical brightening agents; dirt and solid particles in aqueous cleaning fluids; particulate ceramic materials; magnetic materials and magnetic recording media, fire retardants such as those used in plastics materials and biocides, agrochemicals and pharmaceuticals which are applied as dispersions.

A preferred solid is a pigment from any of the recognised classes of pigments described, for example, in the Third Edition of the Colour Index (1971) and subsequent revisions of, and supplements thereto, under the chapter headed "Pigments". Examples of inorganic pigments are titanium dioxide, zinc oxide, Prussian blue, cadmium sulphide, iron oxides, vermilion, ultramarine and the chrome pigments, including chromates, molybdates and mixed chromates and sulphates of lead, zinc, barium, calcium and mixtures and modifications thereof which are commercially available as greenish-yellow to red pigments under the names primrose, lemon, middle, orange, scarlet and red chromes. Examples of organic pigments are those from the azo, disazo, condensed azo, thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. Preferred organic pigments are phthalocyanines, especially copper phthalocyanines, monoazos, disazos, indanthrones, anthranthrones, quinacridones and carbon blacks.

Other preferred solids are: extenders and fillers such as talc, kaolin, silica, barytes and chalk; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g. gamma-$Fe_2O_3$, $Fe_3O_4$, and cobalt-doped iron oxides, calcium oxide, ferrites, especially barium ferrites; and metal particles, especially metallic iron, nickel, cobalt and alloys thereof; agrochemicals such as the fungicides flutriafen, carbendazim, chlorothalonil and mancozeb and fire retardants such as aluminium trihydrate and magnesium hydroxide.

By the term "polar" in relation to the polar liquid is meant an organic liquid or medium capable of forming moderate to strong bonds as described in the article entitled "A Three Dimensional Approach to Solubility" by Crowley et al in Journal of Paint Technology, Vol. 38, 1966, at page 269. Such organic media generally have a hydrogen bonding number of 5 or more as defined in the abovementioned article.

Examples of suitable polar organic liquids are amines, ethers, especially lower alkyl ethers, organic acids, esters, ketones, glycols, alcohols and amides. Numerous specific examples of such moderately and strongly hydrogen bonding liquids are given in the book entitled "Compatibility and Solubility" by Ibert Mellan (published in 1968 by Noyes Development Corporation) in Table 2.14 on pages 39-40 and these liquids all fall within the scope of the term polar organic liquid as used herein. It is preferred that the polar liquid is of the strongly H-bonding type as exemplified on page 40.

Preferred polar organic liquids are mono and poly hydroxy alcohols especially such liquids containing up to, and including, a total of 6 carbon atoms. As examples of the preferred liquids there may be mentioned alkanols such as methanol, ethanol, n-propanol, isopropanol, n-butanol, isobutanol and ethylene glycol. It is especially preferred that the polar liquid is water which may contain up to 50% by weight of a water-soluble polar organic liquid preferably up to 20% of a water-soluble polar organic liquid.

Thus, according to a still further aspect of the invention there is provided a mill-base comprising a particulate solid, dispersant and a water compatible film-forming binder resin. The water compatible resin may be any water-soluble or water insoluble polymer which is used in the water-borne coating industry. Examples of polymers which are commonly used as the principal film-forming binder resin in latex or water-reducible coatings are acrylic, vinyl ester, polyurethane, polyester, epoxy and alkyd.

The dispersion or millbase may also contain a variety of other ingredients which are conventionally incorporated such as antifoam agents and preservatives.

Typically, the mill-base contains from 10 to 80% by weight particulate solid based on the total weight of the mill-base.

Where the particulate solid is an organic pigment or a standard carbon black pigment having a surface area below 200 $m^2/g$, the dispersion may conveniently contain from 20% to 50% by weight of pigment but, where the pigment is inorganic, the dispersion may conveniently contain from 30% to 80% by weight of pigment on the same basis. The dispersion preferably contains at least 1% and preferably contains up to 100%, both by weight with respect to the weight of pigment, of the dispersant. Where the pigment is an organic pigment or carbon black, the dispersion more preferably contains from 5% to 50% and where the pigment is an inorganic pigment, the dispersion preferably contains from 1% to 10%, both by weight with respect to the weight of pigment in the dispersion. However, for high to very high surface area carbon black (having a surface area >200 $m^2/g$), the dispersion may contain as low as 3%, but more preferably from 5% to 30%, pigment on the same basis and the amount of dispersant is preferably from 50% to 100% by weight based on the weight of the pigment.

As already disclosed such a mill-base or dispersion is useful for the preparation of water-borne paints and inks by admixture with further amounts of water-compatible resin(s) and/or water and other ingredients which are conventionally incorporated into water-borne paints and inks, such as preservatives, stabilisers, antifoaming agents, water miscible cosolvents and coalescing agents. Water-borne paints and inks comprising a mill-base or dispersion according to the present invention are a further feature of the present invention.

The dispersants according to the invention may also be used to coat particulate solids such as pigments. Thus, according to a still further aspect of the invention there is provided a composition comprising a particulate solid and a polyurethane polymer as dispersant. Such coated particulate solids may be prepared from the dispersions disclosed hereinbefore by removing the polar liquid.

The dispersions and millbases according to the invention are obtainable by any method known to the art and typically comprise milling the particulate solid, polar liquid and polyurethane polymer in the presence of attrition aids until the desired particle size of the particulate solid is achieved. Preferably the mean particle size is less than 30µ, more preferably less than 20µ and especially less than 10µ.

The polyurethane polymers according to the invention exhibit advantages when used as dispersants compared with dispersants of the prior art. Such advantages include high pigment loadings, lower viscosity of paints, inks and mill-bases, superior gloss, improved colour strength obtained from coloured pigments and "jetness" of black pigments, especially carbon black pigments. These advantages may be obtained without any deleterious effect on other final coating properties such as water resistance.

The dispersion containing pigment, polar liquid medium and polyurethane polymer may be used in non-contact printing such as drop-on-demand or continuous printers which may be of the thermal or piezoelectric type of printer. The dispersant may be used in any ink jet printing ink and includes yellow, magenta, cyan and black disperse dyes or pigments. The polar liquid in the non-contact printing ink is preferably water but may contain up to 60% by weight of a water-soluble co-solvent. Examples of such co-solvents are diethylene glycol, glycerol, 2-pyrolidone, N-methylpyrrolidone, cyclohexanol, caprolactone, caprolactam, pentane-1,5-diol, 2-(butoxyethoxy) ethanol and thiodiglycol, including mixtures thereof.

The ink used in non-contact printing is typically made available in a replaceable cartridge which contains separate reservoirs as containers for the different coloured inks. Thus, according to a further aspect of the invention there is provided a cartridge containing one or more of a dispersant dyes and/or pigments, a polar liquid and a polyurethane polymer as disclosed hereinbefore.

The invention is further illustrated by the following examples wherein all references to amounts are in parts by weight unless indicated to the contrary.

GLOSSARY OF TERMS

In the working examples the following abbreviations are used:

MeOPEG 750 is polyethylene glycol monomethyl ether with number average molecular weight 750 ex Aldrich.

Jeffamine M1000, M2005 and M2070 are monomethyl ethers of poly(ethylene oxide/propylene oxide) having a terminal amino group with molecular weight of about 1000, 2005 and 2070, respectively, ex Huntsman Corporation.

PPG 1000 is polypropylene glycol with molecular weight of about 1000.

PEG 1000 is polyethylene glycol with molecular weight of about 1000.

DMPA is dimethylolpropionic acid.
CHDM is cyclohexane dimethanol.
IPDI is isophorone diisocyanate.
DBTDL is dibutyltin dilaurate.
NMP is N-methylpyrrolidone.
HDI is hexamethylene diisocyanate
HMDI is dicyclohexyl methane-4,4[1]-diisocyanate which is available from Bayer as Desmodar W.
HEINA is N,N-bis(2-hydroxyethyl)isonicotinamide
TMP is trimethylolpropane
MDA is N-methyldiethanolamine
DMBA is dimethylolbutyric acid
HHEE is hydroquinone bis(2-hydroxyethyl)ether
EGSSIPA is 1,3-benzenedicarboxylic acid-5-sulfo-1,3-bis(2-hydroxyethyl) ester, monosodium salt
MEHQ is methoxyhydroquinone
TMXDI is tetramethyl-m-xylidene diisocyanate
ITC1081 is a phosphonic acid containing diol obtained from Albright and Wilson with average structure:

EXAMPLES

Intermediates

Example A

α, α-Dihydroxy Functional PEG

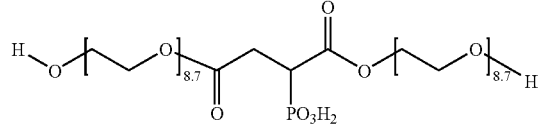

n is about 16

2,4-Toluenediisocyanate (34.8 parts,) was added to a reaction flask and stirred under nitrogen at 50° C. Polyethylene glycol monomethylether (MeOPEG 750, 150 parts ex Aldrich) was preheated to 50° C. and added to the isocyanate with stirring over 1 hour. The reaction was continued at 50° C. for 30 minutes to form an isocyanate end-capped polyether. After cooling to 35° C., diethanolamine (18.1 parts,) was added and the reactants stirred for 1 hour at 35° C. under nitrogen. This is Intermediate 1.

Example B

α, α-Amino Hydroxy Functional Polyether

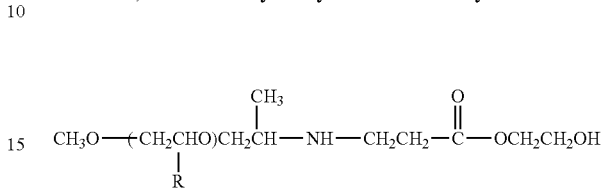

Polyethylene glycol mono methyl ether amine (199.3 parts Jeffamine M1000 ex Huntsman Corp.) was stirred at 70° C. in the presence of air and 2-hydroxyethylacrylate (20.7 parts,) was added together with butylated hydroxy toluene (0.021 parts). The reaction was continued by stirring in air at 70° C. for 6 hours. This is Intermediate 2.

Example C

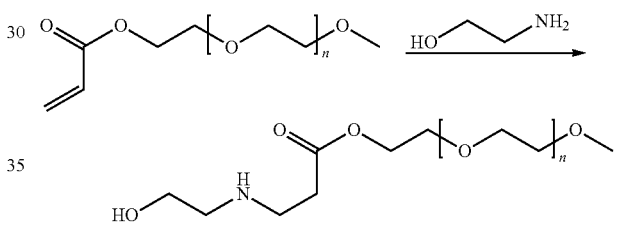

Poly(ethyleneglycol)methylether acrylate (Mol. Wt 454) (200 parts), ethanolamine (25.6) parts and butylated hydroxy toluene (0.054 parts) were added to a stirred glass reaction vessel at about 25° C. An exothermic reaction ensued raising the temperature to 40° C. after about 5 mins. The resulting mixture was heated at 70° C. with stirring for 8 hours to yield the product as a pale yellow liquid. This is intermediate 3.

Example D

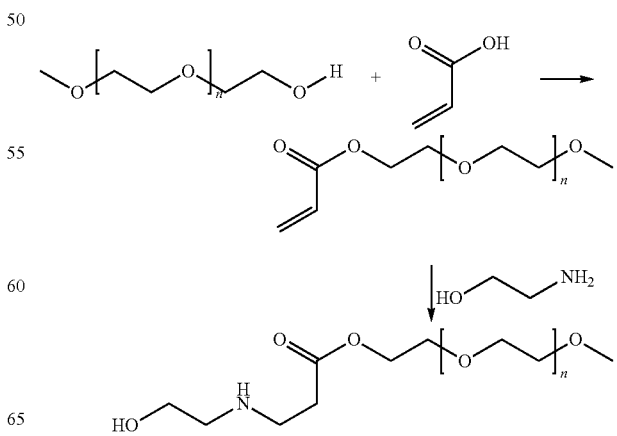

Dry MPEG 750 (300 parts) and toluene (600 parts) were added to a stirred reaction flask fitted with condenser and Dean and Stark collector. The solution was refluxed to remove any residual water. The mixture was cooled to 30° C. and a solution of MEHQ (0.92 parts) in acrylic acid (36 parts) was added followed by conc. sulphuric acid (3.2 parts) The resulting mixture was refluxed for 10 hours in a slow stream of air and water generated was collected in the Dean and Stark apparatus. The resulting mixture was cooled to room temperature and neutralised with calcium carbonate powder. The mixture was filtered and the toluene removed from the filtrate by rotary evaporation to yield the adduct of MPEG 750 and acrylic acid as pale brown waxy solid in yield of 315 parts. 300 parts of this adduct and butylated hydroxy toluene (0.057 parts) were heated to 70° C. in a stirred reaction vessel fitted with condenser. Ethanolamine (22.9 parts) was added and the reaction mixture rapidly exothermed to 87° C. After cooling back to about 70° C. this temperature was maintained for 6 hours to give a pale brown solid on cooling to room temperature. This is Intermediate 4.

Example E

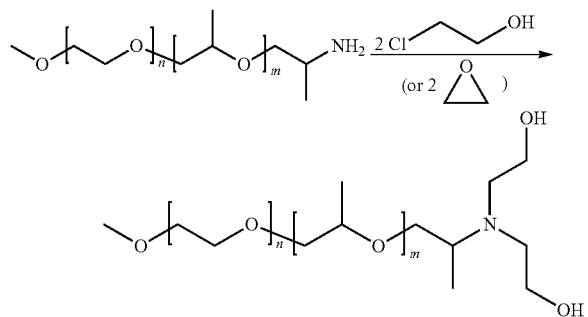

2-chloroethanol (32.2 parts), Jeffamine M1000 (200 parts) and calcium carbonate (110.6 parts) were stirred in toluene (433 parts) in a glass reaction vessel at 130° C. for 18 hours under a nitrogen atmosphere. The mixture was allowed to cool to room temperature then filtered to remove the inorganic solids. The toluene solvent was removed under reduced pressure to give a colourless oil which solidified on standing (205 parts). This is Intermediate 5.

Example F

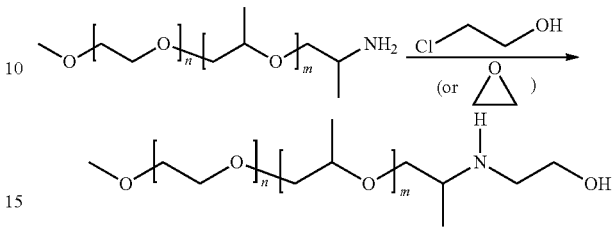

2-chloroethanol (16.1 parts), Jeffamine M1000 (200 parts) and calcium carbonate (55.3 parts) were stirred in toluene (260 parts) in a glass reaction vessel at 130° C. for 18 hours under a nitrogen atmosphere. The mixture was allowed to cool to room temperature then filtered to remove the inorganic solids. The toluene solvent was removed under reduced pressure to give a colourless oil which solidified on standing (208 parts). This is Intermediate 6.

Example G

Jeffamine M2005 ex Huntsman corp. (200.5 parts), hydroxyethyl acrylate (12.18 parts) and butylated hydroxy toluene (0.022 parts) were added to a stirred reaction vessel fitted with condenser and heated to 70° C. and the temperature was maintained for 6 hours. This is Intermediate 7.

Example H

Jeffamine M2070 ex Huntsman corp. (207 parts), hydroxyethyl acrylate (12.18 parts) and butylated hydroxy toluene (0.022 parts) were added to a stirred reaction vessel fitted with condenser and heated to 70° C. and the temperature was maintained for 6 hours. This is Intermediate 8.

Example I

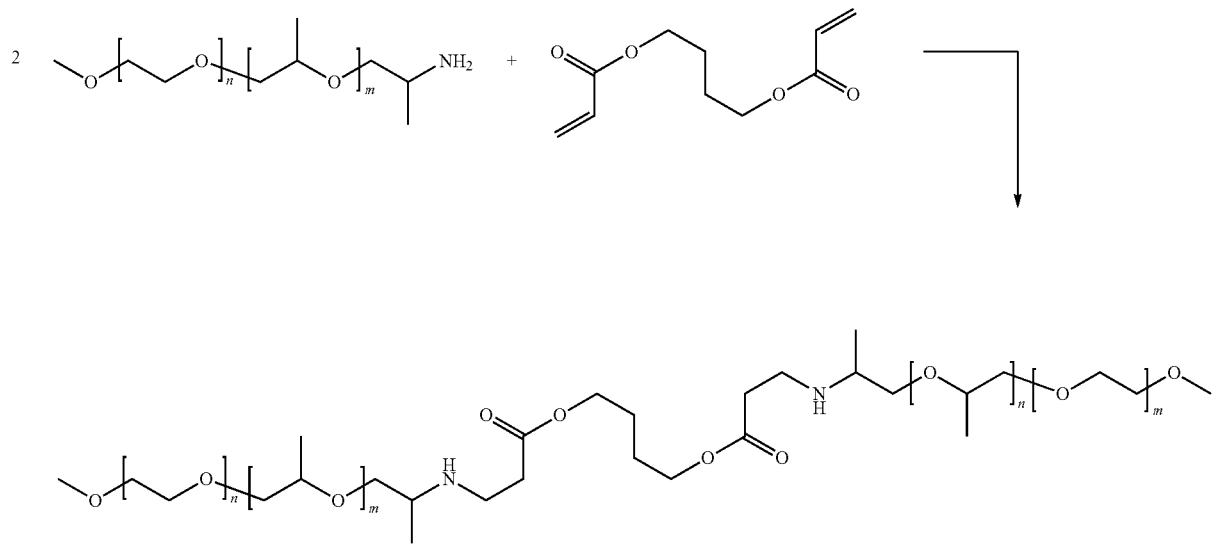

Jeffamine M1000 ex Huntsman (172.6 parts); 1,4-butanediol diacrylate (15.2 parts) and butylated hydroxy toluene (0.019 parts) were added to a stirred glass reaction vessel fitted with condenser under an air atmosphere. The mixture was heated to 70° C. and the temperature maintained for 12 hours to give a yellow liquid which solidified on cooling. This is Intermediate 9.

Example J

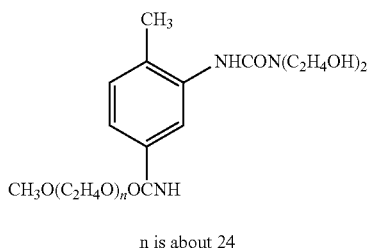

n is about 24

2,4-Toluenediisocyanate (69.6 parts) was added to a reaction flask and stirred under nitrogen at 50° C. Polyethylene glycol monomethylether (MeOPEG 1100, 440 parts ex Aldrich) was preheated to 50° C. and added to the isocyanate with stirring over 50 mins. The reaction was continued at 50° C. for 100 minutes to form an isocyanate end-capped polyether. After cooling to 30° C., diethanolamine (45.4 parts,) was added over 26 mins. The reaction mixture was warmed to 50° C. and temperature maintained for about 1 hour. This is Intermediate 10.

Polyurethane Polymers

Example 1

PU with Both Lateral and Terminal Polyether Chains

The following compounds in the amounts shown were charged to a reaction flask with stirring under nitrogen:

| | |
|---|---|
| DMPA | 8.00 parts |
| CHDM | 7.00 parts |
| PPG 1000 | 14.78 parts |
| Intermediate 1 | 29.56 parts |
| NMP | 25.0 parts |

The reactants were heated to 90° C., and DBTDL (0.08 parts) was added followed by IPDI (40.58 parts). After stirring for 3 hours under nitrogen the isocyanate value was 1.63%. Jeffamine M1000 (51.6 parts) was added and the reaction was continued for a further 1 hour with stirring at 90° C. under nitrogen. Heating was removed. Water (148.8 parts) and 0.88 ammonia (2.7 parts) were added to the hot mixture to give a clear yellow solution with total solids content of 46.3%. This is Dispersant 1.

Example 2

PU with Lateral Polyether Chains

The following compounds in the amounts indicated were added to a reaction flask and stirred under nitrogen at 50° C.

| | |
|---|---|
| DMPA | 16.00 parts |
| CHDM | 13.77 parts |
| PPG 1000 | 6.89 parts |
| Intermediate 2 | 100.00 parts |

DBTDL (0.08 parts) was added with stirring at 50° C. followed by IPDI (63.18 parts). The temperature was then raised to 90° C. and the reactants were stirred at 90° C. under nitrogen for 3.75 hours when no residual isocyanate could be detected. Heating was removed. Water (200 parts) and 0.88 ammonia (5.4 parts) were added to the hot mixture to give a clear yellow solution with total solids content of 49.0%. This is Dispersant 2.

Example 3

PU with Both Lateral and Terminal Polyether Chains

The following compounds in the amounts shown were stirred under nitrogen at 50° C. in a reaction flask:

| | |
|---|---|
| DMPA | 16.00 parts |
| CHDM | 12.09 parts |
| MeOPEG(750) | 63.20 parts |
| Intermediate 2 | 100.00 parts |
| DBTDL | 0.16 parts |

IPDI (17.38 parts) was added and the temperature rose to a maximum of 59° C. 10 minutes after the addition. After stirring for a further 20 mins the temperature was raised to 90° C. and IPDI (54.37 parts) was added. The reactants were stirred at 90-95° C. for a further 3.5 hours under nitrogen. Heating was removed. Water (250 parts) and 0.88 ammonia (5.8 parts) were added to the hot mixture to give a clear yellow solution with total solids content of 48.8%. This is Dispersant 3.

Comparative Example A

PU with about 19% Ethylene Oxide Content

The following compounds in the amounts shown were stirred at 90° C. under nitrogen in a reaction flask:

| | |
|---|---|
| DMPA | 8.00 parts |
| CHDM | 7.00 parts |
| PPG 1000 | 26.87 parts |
| Intermediate 2 | 26.87 parts |
| NMP | 25.00 parts |

DBTDL (0.08 parts) and IPDI (31.19 parts) were added and the reactants were stirred under nitrogen for 4 hours when no residual isocyanate groups could be detected. Heating was removed. Water (75 parts) and 0.88 ammonia (2.7 parts) were added to the hot mixture to give a clear yellow solution having a total solids content of 49.0%. This is Dispersant A.

Comparative Example B

PU without Polyether Lateral Chains

The following compounds in the amounts shown were charged to a reaction flask and stirred at 50° C. under nitrogen.

| | |
|---|---|
| DMPA | 8.00 parts |
| CHDM | 5.01 parts |
| MeOPEG(750) | 32.50 parts |
| PEG 1000 | 50.00 parts |

The reactants were heated to 90° C. and IPDI (36.91 parts) was added over 1 hour with stirring and the reaction was continued with stirring under nitrogen at 90° C. for 2.5 hours when no free isocyanate groups could be detected. Heating was removed. Water (130 parts) and 0.88 ammonia (2.9 parts) were added to the hot mixture to give a clear yellow solution with total solids content of 49.7%. This is Dispersant B.

Example 4

The following reagents were used.

| | |
|---|---|
| DMPA | 5.78 parts |
| CHDM | 2.43 parts |
| Intermediate 3 | 32.53 parts |
| MeOPEG750 | 27.71 parts |
| DBTDL | 0.06 parts |
| Diisocyanate - IPDI | 31.48 parts |

All materials, except the diisocyanate, were added to a dry glass reactor containing a nitrogen atmosphere fitted with mechanical stirrer, water cooled condenser, dropping funnel and thermocouple. The flask contents were heated to 56° C. giving a solution.

Diisocyanate (7.02 parts) was added from the dropping funnel over 5 minutes resulting in an exotherm to 62° C. As the temperature started to drop heating was restarted to raise reaction temperature to 90° C. The remaining diisocyanate (24.46 parts) was fed in over 38 minutes maintaining the temperature at 90 (±2)° C. throughout the feed and for a further 3 hours.

Aqueous ammonia solution (0.88 S.G.) (2.10 parts) was diluted with water (97.90 parts). This ammonia solution was added to the reaction mixture. Heating was stopped but stirring was maintained to dissolve/disperse the polymer resulting in a clear yellow liquid with total solids content of about 50.6%. This is Dispersant 4.

Example 5

The following reagents were used.

| | |
|---|---|
| DMPA | 5.91 parts |
| CHDM | 4.96 parts |
| Intermediate 4 | 33.24 parts |
| MeOPEG750 | 26.14 parts |
| DBTDL | 0.06 parts |
| Diisocyanate - IPDI | 29.69 parts |

All materials, except the diisocyanate, were added to a dry glass reactor containing a nitrogen atmosphere fitted with mechanical stirrer, water cooled condenser, dropping funnel and thermocouple. The flask contents were heated to 49° C. giving a solution.

Diisocyanate (8.38 parts) was added from the dropping funnel over 5 minutes resulting in an exotherm to 55° C. As the temperature started to drop heating was restarted to raise reaction temperature to 90° C. The remaining diisocyanate (21.31 parts) was fed in over about 45 minutes maintaining the temperature at 90 (±2)° C. throughout the feed and for a further 3 hours.

Aqueous ammonia solution (0.88 S.G.) (2.14 parts) was diluted with water (97.86 parts). This ammonia solution was added to the reaction mixture. Heating was stopped but stirring was maintained to dissolve/disperse the polymer resulting in a clear yellow liquid with total solids content of about 50.3%. This is Dispersant 5.

Example 6

The following reagents were used

| | |
|---|---|
| DMPA | 7.53 parts |
| 1,5-pentanediol | 1.84 parts |
| Intermediate 2 | 47.08 parts |
| pentanol | 5.84 parts |
| DBTDL | 0.08 parts |
| Diisocyanate - HMDI | 37.63 parts |

All materials, except the diisocyanate, were added to a dry glass reactor containing a nitrogen atmosphere fitted with mechanical stirrer, water cooled condenser, dropping funnel and thermocouple. The flask contents were heated to 70° C. giving a solution.

The diisocyanate was added from the dropping funnel over 42 minutes. The temperature rose to 90° C. during the addition after 10 minutes. This temperature was maintained (±2)° C. throughout the feed and for a further 3 hours.

Aqueous ammonia solution (0.88 S.G.) (2.73 parts) was diluted with water (97.27 parts). This ammonia solution was added to the reaction mixture. Heating was stopped but stirring was maintained to dissolve/disperse the polymer resulting in a clear yellow liquid with total solids content of 50.3%. This is Dispersant 6.

Example 7

The following reagents were used

| | |
|---|---|
| DMPA | 10.23 parts |
| CHDM | 3.35 parts |
| Intermediate 2 | 42.63 parts |
| dihexylamine | 14.74 parts |
| DBTDL | 0.07 parts |
| Diisocyanate - HDI | 28.98 parts |

All materials, except the diisocyanate, were added to a dry glass reactor containing a nitrogen atmosphere fitted with mechanical stirrer, water cooled condenser, dropping funnel and thermocouple. The flask contents were heated to 77° C. giving a solution.

The diisocyanate was added from the dropping funnel over 1 hour whilst continuing to heat the reaction mixture. The temperature rose to 90° C. during the addition after 25 minutes. This temperature was maintained (±2)° C. throughout the feed and for a further 3 hours 20 minutes.

Aqueous ammonia solution (0.88 S.G.) (3.71 parts) was diluted with water (96.29 parts). This ammonia solution was added to the reaction mixture. Heating was stopped but stirring was maintained to dissolve/disperse the polymer resulting in a cloudy yellow liquid with total solids content of 47.4%. This is Dispersant 7.

Example 8

The following reagents were used

| | | |
|---|---|---|
| DMPA | 5.86 | parts |
| Intermediate 2 | 28.32 | parts |
| MeOPEG1100 | 43.36 | parts |
| DBTDL | 0.05 | parts |
| Diisocyanate - HMDI | 22.41 | parts |

All materials, except the diisocyanate, were added to a dry glass reactor containing a nitrogen atmosphere fitted with mechanical stirrer, water cooled condenser, dropping funnel and thermocouple. The flask contents were heated to 65° C. giving a solution.

The diisocyanate was added from the dropping funnel over 56 mins whilst continuing to heat the reaction mixture. The temperature rose to 90° C. during the addition after 13 minutes. This temperature was maintained (±2)° C. throughout the feed and for a further 3 hours 20 minutes.

Aqueous ammonia solution (0.88 S.G.) (2.12 parts) was diluted with water (97.88 parts). This ammonia solution was added to the reaction mixture. Heating was stopped but stirring was maintained to dissolve/disperse the polymer resulting in a cloudy yellow liquid with total solids content of 48.9%. This is Dispersant 8.

Example 9

The following reagents were used

| | | |
|---|---|---|
| DMPA | 7.62 | parts |
| Intermediate 2 | 24.89 | parts |
| MeOPEG1100 | 50.22 | parts |
| DBTDL | 0.04 | parts |
| Diisocyanate - TDI | 17.23 | parts |

All materials, except the diisocyanate, were added to a dry glass reactor containing a nitrogen atmosphere fitted with mechanical stirrer, water cooled condenser, dropping funnel and thermocouple. The flask contents were heated to 78° C. giving a solution.

The diisocyanate was added from the dropping funnel over 48 mins whilst continuing to heat the reaction mixture. The temperature rose to 90° C. during the addition after 12 minutes. This temperature was maintained (±2)° C. throughout the feed and for a further 3 hours 11 minutes.

Aqueous ammonia solution (0.88 S.G.) (2.76 parts) was diluted with water (97.24 parts). This ammonia solution was added to the reaction mixture. Heating was stopped but stirring was maintained to dissolve/disperse the polymer resulting in a cloudy yellow liquid with total solids content of 49.9%. This is Dispersant 9.

Example 10

The following reagents were used

| | | |
|---|---|---|
| DMPA | 6.50 | parts |
| 1,6-hexanediol | 4.22 | parts |
| Intermediate 5 | 21.68 | parts |
| MeOPEG1100 | 45.8 | parts |
| DBTDL | 0.04 | parts |
| Diisocyanate - TDI | 21.76 | parts |

All materials, except the diisocyanate, were added to a dry glass reactor containing a nitrogen atmosphere fitted with mechanical stirrer, water cooled condenser, dropping funnel and thermocouple. The flask contents were heated to 86° C. giving a solution.

The diisocyanate was added from the dropping funnel over 60 minutes whilst continuing to heat the reaction mixture. The temperature rose to 90° C. during the addition after 14 minutes. This temperature was maintained (±2)° C. throughout the feed and for a further 3 hours 10 minutes.

Aqueous ammonia solution (0.88 S.G.) (2.35 parts) was diluted with water (97.65 parts). This ammonia solution was added to the reaction mixture. Heating was stopped but stirring was maintained to dissolve/disperse the polymer resulting in a clear yellow liquid with total solids content of 49.9%. This is Dispersant 10.

Example 11

The following reagents were used

| | | |
|---|---|---|
| DMPA | 6.14 | parts |
| HEINA | 5.81 | parts |
| Intermediate 2 | 38.39 | parts |
| MeOPEG750 | 23.22 | parts |
| DBTDL | 0.06 | parts |
| Diisocyanate - IPDI | 26.38 | parts |

All materials, except the diisocyanate, were added to a dry glass reactor containing a nitrogen atmosphere fitted with mechanical stirrer, water cooled condenser, dropping funnel and thermocouple. The flask contents were heated to 86° C. giving a solution.

The diisocyanate was added from the dropping funnel over 47 minutes whilst continuing to heat the reaction mixture. The temperature rose to 90° C. during the addition after 19 minutes. This temperature was maintained (±2)° C. throughout the feed and for a further 3 hours 6 minutes.

Aqueous ammonia solution (0.88 S.G.) (2.22 parts) was diluted with water (97.78 parts). This ammonia solution was added to the reaction mixture. Heating was stopped but stirring was maintained to dissolve/disperse the polymer resulting in a clear yellow liquid with total solids content of 50.5%. This is Dispersant 11.

Example 12

The following reagents were used

| | | |
|---|---|---|
| DMPA | 6.09 | parts |
| HEINA | 4.83 | parts |
| Intermediate 1 | 38.08 | parts |
| MeOPEG750 | 23.85 | parts |
| DBTDL | 0.06 | parts |
| Diisocyanate - IPDI | 27.10 | parts |

All materials, except the diisocyanate, were added to a dry glass reactor containing a nitrogen atmosphere fitted with mechanical stirrer, water cooled condenser, dropping funnel and thermocouple. The flask contents were heated to 59° C. giving a solution.

The diisocyanate was added from the dropping funnel over 48 minutes whilst continuing to heat the reaction mixture. The temperature rose to 90° C. during the addition after 19 minutes. This temperature was maintained (±2)° C. throughout the feed and for a further 3 hours 7 minutes.

Aqueous ammonia solution (0.88 S.G.) (2.21 parts) was diluted with water (97.79 parts). This ammonia solution was added to the reaction mixture. Heating was stopped but stirring was maintained to dissolve/disperse the polymer resulting in a clear yellow liquid with total solids content of 49.2%. This is Dispersant 12.

Example 13

The following reagents were used

| | | |
|---|---|---|
| DMPA | 6.26 | parts |
| TMP | 3.26 | parts |
| CHDM | 5.64 | parts |
| Intermediate 2 | 14.60 | parts |
| MeOPEG750 | 42.06 | parts |
| DBTDL | 0.05 | parts |
| Diisocyanate - TDI | 28.14 | parts |

All materials, except the diisocyanate, were added to a dry glass reactor containing a nitrogen atmosphere fitted with mechanical stirrer, water cooled condenser, dropping funnel and thermocouple. The flask contents were heated to 88° C. giving a solution.

The diisocyanate was added from the dropping funnel over 66 minutes maintaining the temperature at 90 (±2)° C. throughout the feed and for a further 4 hours 49 minutes. Aqueous ammonia solution (0.88 S.G.) (2.27 parts) was diluted with water (97.73 parts). This ammonia solution was added to the reaction mixture. Heating was stopped but stirring was maintained to dissolve/disperse the polymer resulting in a clear yellow liquid with total solids content of 49.7%. This is Dispersant 13.

Example 14

The following reagents were used

| | | |
|---|---|---|
| DMPA | 6.67 | parts |
| TMP | 4.45 | parts |
| CHDM | 4.82 | parts |
| Intermediate 2 | 17.81 | parts |
| MeOPEG750 | 39.02 | parts |
| DBTDL | 0.05 | parts |
| Diisocyanate - TDI | 27.18 | parts |

All materials, except the diisocyanate, were added to a dry glass reactor containing a nitrogen atmosphere fitted with mechanical stirrer, water cooled condenser, dropping funnel and thermocouple. The flask contents were heated to 88° C. giving a solution.

The diisocyanate was added from the dropping funnel over 57 minutes maintaining the temperature at 90 (±2)° C. throughout the feed and for a further 3 hours 39 minutes.

Aqueous ammonia solution (0.88 S.G.) (2.8 parts) was diluted with water (97.2 parts). This ammonia solution was added to the reaction mixture. Heating was stopped but stirring was maintained to dissolve/disperse the polymer resulting in a clear yellow liquid with total solids content of 51.1%. This is Dispersant 14.

Example 15

The following reagents were used

| | | |
|---|---|---|
| DMPA | 7.20 | parts |
| CHDM | 6.51 | parts |
| Intermediate 2 | 44.99 | parts |
| MeOPEG750 | 10.03 | parts |
| DBTDL | 0.07 | parts |
| Diisocyanate - IPDI | 31.20 | parts |

All materials, except the diisocyanate, were added to a dry glass reactor containing a nitrogen atmosphere fitted with mechanical stirrer, water cooled condenser, dropping funnel and thermocouple. The flask contents were heated to 60° C. giving a solution.

The diisocyanate was added from the dropping funnel over 26 minutes whilst continuing to heat the reaction mixture. The temperature rose during the addition to 90° C. after 16 minutes. This temperature was maintained (±2)° C. throughout the remainder of the feed and for a further 3 hours 16 minutes.

Aqueous ammonia solution (0.88 S.G.) (2.61 parts) was diluted with water (97.39 parts). This ammonia solution was added to the reaction mixture. Heating was stopped but stirring was maintained to dissolve/disperse the polymer resulting in a clear yellow liquid with total solids content of 51.0%. This is Dispersant 15.

Example 16

The following reagents were used

| | | |
|---|---|---|
| DMPA | 9.11 | parts |
| CHDM | 1.41 | parts |
| Intermediate 2 | 37.95 | parts |
| MeOPEG750 | 24.1 | parts |
| DBTDL | 0.06 | parts |
| Diisocyanate - IPDI | 27.38 | parts |

All materials, except the diisocyanate, were added to a dry glass reactor containing a nitrogen atmosphere fitted with mechanical stirrer, water cooled condenser, dropping funnel and thermocouple. The flask contents were heated to 58° C. giving a solution.

The diisocyanate was added from the dropping funnel over 55 minutes whilst continuing to heat the reaction mixture. The temperature rose during the addition to 90° C. after about 30 minutes. This temperature was maintained (±2)° C. throughout the remainder of the feed and for a further 2 hours 52 minutes.

Aqueous ammonia solution (0.88 S.G.) (3.30 parts) was diluted with water (96.70 parts). This ammonia solution was added to the reaction mixture. Heating was stopped but stirring was maintained to dissolve/disperse the polymer resulting in a clear yellow liquid with total solids content of 50.6%. This is Dispersant 16.

Example 17

The following reagents were used

| | |
|---|---|
| CHDM | 11.0 parts |
| Intermediate 2 | 38.10 parts |
| MeOPEG750 | 23.80 parts |
| DBTDL | 0.06 parts |
| Diisocyanate - IPDI | 27.04 parts |

All materials, except the diisocyanate, were added to a dry glass reactor containing a nitrogen atmosphere fitted with mechanical stirrer, water cooled condenser, dropping funnel and thermocouple. The flask contents were heated to 50° C. giving a solution.

The diisocyanate was added from the dropping funnel over 44 minutes whilst continuing to heat the reaction mixture. The temperature rose to 94° C. during the addition after 23 minutes. The temperature was allowed to drop back to 90° C. by removing heating and maintained (±2)° C. throughout the feed and for a further 3 hours 29 minutes.

Water (100 parts) was added to the reaction mixture. Heating was stopped but stirring was maintained to dissolve/disperse the polymer resulting in a hazy yellow liquid with total solids content of 50.6%. This Is Dispersant 17.

Example 18

The following reagents were used

| | |
|---|---|
| CHDM | 4.98 parts |
| Intermediate 2 | 57.18 parts |
| MeOPEG750 | 17.69 parts |
| DBTDL | 0.07 parts |
| Diisocyanate - IPDI | 20.09 parts |

All materials, except the diisocyanate, were added to a dry glass reactor containing a nitrogen atmosphere fitted with mechanical stirrer, water cooled condenser, dropping funnel and thermocouple. The flask contents were heated to 50° C. giving a solution.

Diisocyanate (9.85 parts) was added from the dropping funnel over 10 minutes resulting in an exotherm to 57° C. As the temperature started to drop heating was restarted to raise reaction temperature to 90° C. The remaining diisocyanate (10.24 parts) was fed in over 51 minutes maintaining the temperature at 90 (±2)° C. throughout the feed and for a further 3 hours 25 minutes.

Hot water (112.8 parts) was added to the reaction mixture. Heating was stopped but stirring was maintained to dissolve/disperse the polymer resulting in a hazy yellow liquid with total solids content of 45.0%. This is Dispersant 18.

Example 19
The following reagents were used

| | |
|---|---|
| DMPA | 1.61 parts |
| CHDM | 4.88 parts |
| Intermediate 2 | 52.03 parts |
| MeOPEG750 | 19.39 parts |
| DBTDL | 0.06 parts |
| Diisocyanate - IPDI | 22.03 parts |

All materials, except the diisocyanate, were added to a dry glass reactor containing a nitrogen atmosphere fitted with mechanical stirrer, water cooled condenser, dropping funnel and thermocouple. The flask contents were heated to 50° C. giving a solution.

Diisocyanate (8.96 parts) was added from the dropping funnel over 6 minutes resulting in an exotherm to 59° C. As the temperature started to drop heating was restarted to raise reaction temperature to 90° C. The remaining diisocyanate (13.07 parts) was fed in over 9 minutes maintaining the temperature at 90 (±2)° C. throughout the feed and for a further 2 hours 38 minutes.

Aqueous ammonia solution (0.88 S.G.) (0.58 parts) was diluted with water (99.42 parts). This ammonia solution was added to the reaction mixture. Heating was stopped but stirring was maintained to dissolve/disperse the polymer resulting in a clear yellow liquid with total solids content of 51.6%. This is Dispersant 19.

Example 20

The following reagents were used

| | |
|---|---|
| DMPA | 4.59 parts |
| MDA | 5.37 parts |
| Intermediate 2 | 37.78 parts |
| MeOPEG750 | 24.43 parts |
| DBTDL | 0.06 parts |
| Diisocyanate - IPDI | 27.76 parts |

All materials, except the diisocyanate, were added to a dry glass reactor containing a nitrogen atmosphere fitted with mechanical stirrer, water cooled condenser, dropping funnel and thermocouple. The flask contents were heated to 52° C. giving a solution.

The diisocyanate was added from the dropping funnel over 44 minutes whilst continuing to heat the reaction mixture. The temperature rose during the addition to 90° C. after 25 minutes. This temperature was maintained (±2)° C. throughout the remainder of the feed and for a further 3 hours 4 minutes.

Water (100 parts) was added to the reaction mixture. Heating was stopped but stirring was maintained to dissolve/disperse the polymer resulting in a hazy yellow liquid with total solids content of 51.3%. This is Dispersant 20.

Example 21

The following reagents were used

| | |
|---|---|
| DMPA | 6.05 parts |
| CHDM | 3.94 parts |
| Intermediate 6 | 37.79 parts |
| MeOPEG750 | 24.42 parts |
| DBTDL | 0.06 parts |
| Diisocyanate - IPDI | 27.75 parts |

All materials, except the diisocyanate, were added to a dry glass reactor containing a nitrogen atmosphere fitted with mechanical stirrer, water cooled condenser, dropping funnel and thermocouple. The flask contents were heated to 53° C. giving a solution.

The diisocyanate was added from the dropping funnel over 52 minutes whilst continuing to heat the reaction mixture. The temperature rose during the addition to 90° C. after about 30 minutes. This temperature was maintained (±2)° C. throughout the remainder of the feed and for a further 3 hours 5 minutes.

Aqueous ammonia solution (0.88 S.G.) (2.19 parts) was diluted with water (97.81 parts). This ammonia solution was added to the reaction mixture. Heating was stopped but stirring was maintained to dissolve/disperse the polymer resulting in a clear yellow liquid with total solids content of 49.1%. This is Dispersant 21.

Example 22

The following reagents were used

| | | |
|---|---|---|
| DMPA | 6.04 | parts |
| CHDM | 3.83 | parts |
| Intermediate 1 | 37.75 | parts |
| MeOPEG750 | 24.49 | parts |
| DBTDL | 0.06 | parts |
| Diisocyanate - IPDI | 27.83 | parts |

All materials, except the diisocyanate, were added to a dry glass reactor containing a nitrogen atmosphere fitted with mechanical stirrer, water cooled condenser, dropping funnel and thermocouple. The flask contents were heated to 51° C. giving a solution.

The diisocyanate was added from the dropping funnel over 45 minutes whilst continuing to heat the reaction mixture. The temperature rose during the addition to 93° C. on completion of the addition. The temperature was maintained at 90 (±3)° C. for a further 3 hours 40 minutes.

Aqueous ammonia solution (0.88 S.G.) (2.19 parts) was diluted with water (97.81 parts). This ammonia solution was added to the reaction mixture. Heating was stopped but stirring was maintained to dissolve/disperse the polymer resulting in a clear yellow liquid with total solids content of 49.3%. This is Dispersant 22.

Example 23

The following reagents were used

| | | |
|---|---|---|
| DMPA | 6.12 | parts |
| Intermediate 7 | 23.77 | parts |
| Intermediate 2 | 14.45 | parts |
| CHDM | 5.29 | parts |
| MeOPEG750 | 23.55 | parts |
| DBTDL | 0.06 | parts |
| Diisocyanate - IPDI | 26.76 | parts |

All materials, except the diisocyanate, were added to a dry glass reactor containing a nitrogen atmosphere fitted with mechanical stirrer, water cooled condenser, dropping funnel and thermocouple. The flask contents were heated to 91° C. giving a solution.

The diisocyanate was added from the dropping funnel over 53 minutes whilst maintaining the temperature at 90 (±2)° C. This temperature was maintained for a further 3 hours 2 minutes.

Aqueous ammonia solution (0.88 S.G.) (2.22 parts) was diluted with water (97.78 parts). This ammonia solution was added to the reaction mixture. Heating was stopped but stirring was maintained to dissolve/disperse the polymer resulting in a clear yellow liquid with total solids content of 50.5%. This is Dispersant 23.

Example 24

The following reagents were used

| | | |
|---|---|---|
| DMPA | 6.46 | parts |
| Intermediate 2 | 48.43 | parts |
| MeOPEG750 | 19.25 | parts |
| DBTDL | 0.06 | parts |
| Diisocyanate - HMDI | 25.80 | parts |

All materials, except the diisocyanate, were added to a dry glass reactor containing a nitrogen atmosphere fitted with mechanical stirrer, water cooled condenser, dropping funnel and thermocouple. The flask contents were heated to 66° C. giving a solution.

The diisocyanate was added from the dropping funnel over 39 minutes whilst continuing to heat the reaction mixture. The temperature rose during the addition to 92° C. after about 20 minutes. The temperature was maintained at 90 (±2)° C. throughout the remainder of the feed and for a further 3 hours.

Aqueous ammonia solution (0.88 S.G.) (2.34 parts) was diluted with water (97.66 parts). This ammonia solution was added to the reaction mixture. Heating was stopped but stirring was maintained to dissolve/disperse the polymer resulting in a clear yellow liquid. This is Dispersant 24.

Example 25

The following reagents were used

| | | |
|---|---|---|
| DMBA | 6.65 | parts |
| PPG1000 | 2.41 | parts |
| CHDM | 4.82 | parts |
| Intermediate 2 | 41.54 | parts |
| MeOPEG750 | 16.93 | parts |
| DBTDL | 0.07 | parts |
| Diisocyanate - IPDI | 27.60 | parts |

All materials, except the diisocyanate, were added to a dry glass reactor containing a nitrogen atmosphere fitted with mechanical stirrer, water cooled condenser, dropping funnel and thermocouple. The flask contents were heated to 50° C. giving a solution.

Diisocyanate (7.25 parts) was added from the dropping funnel over 11 minutes resulting in an exotherm to 56° C. As the temperature started to drop heating was restarted to raise reaction temperature to 90° C. The remaining diisocyanate (20.35 parts) was fed in over 37 minutes maintaining the temperature at 90 (±2)° C. throughout the feed and for a further 3 hours 43 minutes.

Aqueous ammonia solution (0.88 S.G.) (2.19 parts) was diluted with water (100.21 parts). This ammonia solution was added to the reaction mixture. Heating was stopped but stirring was maintained to dissolve/disperse the polymer resulting in a clear yellow liquid with total solids content of 50.0%. This is Dispersant 25.

Example 26

The following reagents were used

| | |
|---|---|
| DMPA | 6.14 parts |
| CHDM | 5.76 parts |
| Intermediate 8 | 38.36 parts |
| MeOPEG750 | 23.29 parts |
| DBTDL | 0.06 parts |
| Diisocyanate - IPDI | 26.40 parts |

All materials, except the diisocyanate, were added to a dry glass reactor containing a nitrogen atmosphere fitted with mechanical stirrer, water cooled condenser, dropping funnel and thermocouple. The flask contents were heated to 61° C. giving a solution.

Diisocyanate (3.90 parts) was added from the dropping funnel over 5 minutes resulting in an exotherm to 63° C. As the temperature started to drop heating was restarted to raise reaction temperature to 90° C. The remaining diisocyanate (22.50 parts) was fed in over 45 minutes maintaining the temperature at 90 (±2)° C. throughout the feed and for a further 3 hours 40 minutes.

Aqueous ammonia solution (0.88 S.G.) (2.22 parts) was diluted with water (97.78 parts). This ammonia solution was added to the reaction mixture. Heating was stopped but stirring was maintained to dissolve/disperse the polymer resulting in a clear yellow liquid with total solids content of 48.9%. This is Dispersant 26.

Example 27

The following reagents were used

| | |
|---|---|
| DMPA | 8.00 parts |
| CHDM | 6.89 parts |
| PPG1000 | 3.44 parts |
| Intermediate 2 | 50.00 parts |
| DBTDL | 0.08 parts |
| Diisocyanate - IPDI | 31.59 parts |

All materials, except the diisocyanate, were added to a dry glass reactor containing a nitrogen atmosphere fitted with mechanical stirrer, water cooled condenser, dropping funnel and thermocouple. The flask contents were heated to 51° C. giving a solution.

The diisocyanate was added from the dropping funnel rapidly resulting in an exotherm. Heating was continued and the reaction temperature reached 90° C. after 16 minutes. The temperature was maintained at 90 (±2)° C. for a further 3 hours 17 minutes.

Aqueous ammonia solution (0.88 S.G.) (2.7 parts) was diluted with water (100 parts). This ammonia solution was added to the reaction mixture. Heating was stopped but stirring was maintained to dissolve/disperse the polymer resulting in a clear yellow liquid with total solids content of 49.0%. This is Dispersant 27.

Example 28

The following reagents were used

| | |
|---|---|
| DMPA | 8.00 parts |
| CHDM | 6.89 parts |
| PPG1000 | 3.44 parts |
| Intermediate 2 | 50.00 parts |
| DBTDL | 0.08 parts |
| NMP | 25.00 parts |
| Diisocyanate - IPDI | 31.59 parts |

All materials, except the diisocyanate, were added to a dry glass reactor containing a nitrogen atmosphere fitted with mechanical stirrer, water cooled condenser, dropping funnel and thermocouple. The flask contents were heated to 50° C. giving a solution.

The diisocyanate was added from the dropping funnel rapidly resulting in an exotherm. Heating was continued and the reaction temperature reached 92° C. after 39 minutes. The temperature was maintained at 89-97° C. for a further 3 hours 39 minutes.

Aqueous ammonia solution (0.88 S.G.) (2.7 parts) was diluted with water (75 parts). This ammonia solution was added to the reaction mixture. Heating was stopped but stirring was maintained to dissolve/disperse the polymer resulting in a clear yellow liquid with total solids content of 48.1%. This is Dispersant 28.

Example 29

The following reagents were used

| | |
|---|---|
| DMPA | 6.62 parts |
| HHEE | 6.62 parts |
| Intermediate 2 | 41.39 parts |
| MeOPEG750 | 17.23 parts |
| DBTDL | 0.07 parts |
| Diisocyanate - IPDI | 28.08 parts |

All materials, except the diisocyanate, were added to a dry glass reactor containing a nitrogen atmosphere fitted with mechanical stirrer, water cooled condenser, dropping funnel and thermocouple. The flask contents were heated to 85° C. giving a solution and allowed to cool to 50° C.

Diisocyanate (7.13 parts) was added from the dropping funnel over 5 minutes resulting in an exotherm to 57° C. As the temperature started to drop heating was restarted to raise reaction temperature to 90° C. The remaining diisocyanate (20.95 parts) was fed in over 60 minutes maintaining the temperature at 90 (±2)° C. throughout the feed and for a further 2 hours 23 minutes.

Aqueous ammonia solution (0.88 S.G.) (2.9 parts) was diluted with water (97.1 parts). This ammonia solution was added to the reaction mixture. Heating was stopped but stirring was maintained to dissolve/disperse the polymer resulting in a clear yellow liquid with total solids content of 49.0%. This is Dispersant 29.

Example 30

The following reagents were used

| | |
|---|---|
| DMPA | 6.61 parts |
| CHDM | 1.87 parts |
| Intermediate 1 | 33.04 parts |
| MeOPEG750 | 33.93 parts |
| DBTDL | 0.05 parts |
| Diisocyanate - IPDI | 25.14 parts |

All materials, except the diisocyanate, were added to a dry glass reactor containing a nitrogen atmosphere fitted with mechanical stirrer, water cooled condenser, dropping funnel and thermocouple. The flask contents were heated to 60° C. giving a solution.

The diisocyanate was added from the dropping funnel over 32 minutes whilst continuing to heat the reaction mixture. The temperature rose during the addition reaching 90° C. when complete. This temperature was maintained (±2)° C. for a further 3 hours 12 minutes.

Aqueous ammonia solution (0.88 S.G.) (2.39 parts) was diluted with water (97.61 parts). This ammonia solution was added to the reaction mixture. Heating was stopped but stirring was maintained to dissolve/disperse the polymer resulting in a cloudy yellow liquid with total solids content of 50.1%. This is Dispersant 30.

Example 31

The following reagents were used

| | |
|---|---|
| DMPA | 5.66 parts |
| CHDM | 3.00 parts |
| Intermediate 10 | 35.41 parts |
| MeOPEG1100 | 29.19 parts |
| DBTDL | 0.06 parts |
| Diisocyanate - HMDI | 26.69 parts |

All materials, except the diisocyanate, were added to a dry glass reactor containing a nitrogen atmosphere fitted with mechanical stirrer, water cooled condenser, dropping funnel and thermocouple. The flask contents were heated to 51° C. giving a solution.

The diisocyanate was added from the dropping funnel over 57 minutes whilst continuing to heat the reaction mixture. The temperature rose to 90° C. during the addition after 13 minutes. This temperature was maintained (±2)° C. throughout the feed and for a further 3 hours 21 minutes.

Aqueous ammonia solution (0.88 S.G.) (2.05 parts) was diluted with water (97.95 parts). This ammonia solution was added to the reaction mixture. Heating was stopped but stirring was maintained to dissolve/disperse the polymer resulting in a clear yellow liquid with total solids content of about 50%. This is Dispersant 31.

Example 32

The following reagents were used

| | | |
|---|---|---|
| 1 | DMPA | 6.29 parts |
| 2 | PPG1000 | 2.11 parts |
| 3 | CHDM | 4.23 parts |
| 4 | Intermediate 2 | 39.29 parts |
| 5 | DBTDL | 0.06 parts |
| 6 | Diisocyanate - IPDI | 26.60 parts |
| 7 | Jeffamine M1000 | 21.42 parts |

Materials 1 to 5 from the list of reagents above were added to a dry glass reactor containing a nitrogen atmosphere fitted with mechanical stirrer, water cooled condenser, dropping funnel and thermocouple. The flask contents were heated to 55° C. giving a solution.

The diisocyanate was added from the dropping funnel over 11 minutes with the temperature remaining roughly constant. Heating was increased and the reaction temperature reached 99° C. after a further 32 minutes. Heating was removed and the mixture cooled to 90° C. and then maintained at 90 (±2)° C. throughout. 3 hours 17 minutes after the diisocyanate addition was complete the Jeffamine M1000 (preheated to 50° C. to melt it) was added to the reaction vessel and the mixture stirred for a further 77 minutes.

Aqueous ammonia solution (0.88 S.G.) (2.12 parts) was diluted with water (98.23 parts). This ammonia solution was added to the reaction mixture. Heating was stopped but stirring was maintained to dissolve/disperse the polymer resulting in a clear yellow liquid with total solids content of 49.0%. This is Dispersant 32.

Example 33

The following reagents were used

| | | |
|---|---|---|
| 1 | DMPA | 6.18 parts |
| 2 | PPG1000 | 2.08 parts |
| 3 | CHDM | 4.16 parts |
| 4 | Intermediate 2 | 38.62 parts |
| 5 | DBTDL | 0.06 parts |
| 6 | Diisocyanate - IPDI | 26.15 parts |
| 7 | MeOPEG1100 | 22.75 parts |

Materials 1 to 5 from the list of reagents above were added to a dry glass reactor containing a nitrogen atmosphere fitted with mechanical stirrer, water cooled condenser, dropping funnel and thermocouple. The flask contents were heated to 48° C. giving a solution.

The diisocyanate was added from the dropping funnel over 8 minutes resulting in an exotherm to 54° C. Heating was increased and the reaction temperature reached 90(±2)° C. after a further 9 minutes and then maintained at 90(±2)° C. throughout. 3 hours 35 minutes after the diisocyanate addition was complete the MeOPEG 1100 (preheated to 50° C. to melt it) was added to the reaction vessel and the mixture stirred for a further 90 minutes.

Aqueous ammonia solution (0.88 S.G.) (2.08 parts) was diluted with water (100 parts). This ammonia solution was added to the reaction mixture. Heating was stopped but stirring was maintained to dissolve/disperse the polymer resulting in a clear yellow liquid with total solids content of 50.2%. This is Dispersant 33.

Example 34

The following reagents were used

| | | |
|---|---|---|
| DMPA | 6.08 | parts |
| CHDM | 4.56 | parts |
| Intermediate 9 | 37.99 | parts |
| MeOPEG750 | 24.02 | parts |
| DBTDL | 0.06 | parts |
| Diisocyanate - IPDI | 27.29 | parts |

All materials, except the diisocyanate, were added to a dry glass reactor containing a nitrogen atmosphere fitted with mechanical stirrer, water cooled condenser, dropping funnel and thermocouple. The flask contents were heated to 50° C. giving a solution.

Diisocyanate (6.63 parts) was added from the dropping funnel over 11 minutes resulting in an exotherm to 57° C. As the temperature started to drop heating was restarted to raise reaction temperature to 90° C. The remaining diisocyanate (20.66 parts) was fed in over 43 minutes maintaining the temperature at 90 (±2)° C. throughout the feed and for a further 2 hours 55 minutes.

Aqueous ammonia solution (0.88 S.G.) (2.2 parts) was diluted with water (97.8 parts). This ammonia solution was added to the reaction mixture. Heating was stopped but stirring was maintained to dissolve/disperse the polymer resulting in a clear yellow liquid with total solids content of 50.0%. This is Dispersant 34.

Example 35

The following reagents were used

| | | |
|---|---|---|
| DMPA | 6.18 | parts |
| CHDM | 1.00 | parts |
| Intermediate 9 | 49.85 | parts |
| MeOPEG750 | 22.71 | parts |
| DBTDL | 0.06 | parts |
| Diisocyanate - IPDI | 20.19 | parts |

All materials, except the diisocyanate, were added to a dry glass reactor containing a nitrogen atmosphere fitted with mechanical stirrer, water cooled condenser, dropping funnel and thermocouple. The flask contents were heated to 50° C. giving a solution.

Diisocyanate (5.35 parts) was added from the dropping funnel over 5 minutes resulting in an exotherm to 57° C. As the temperature started to drop heating was restarted to raise reaction temperature to 90° C. The remaining diisocyanate (14.84 parts) was fed in over 33 minutes maintaining the temperature at 90 (±2)° C. throughout the feed and for a further 3 hours 9 minutes.

Aqueous ammonia solution (0.88 S.G.) (2.24 parts) was diluted with water (97.76 parts). This ammonia solution was added to the reaction mixture. Heating was stopped but stirring was maintained to dissolve/disperse the polymer resulting in a clear yellow liquid with total solids content of 49.6%. This is Dispersant 35.

Example 36

The following reagents were used

| | | |
|---|---|---|
| DMPA | 4.36 | parts |
| 1,6-hexanediol | 3.57 | parts |
| Intermediate 9 | 43.65 | parts |
| MeOPEG1100 | 27.25 | parts |
| DBTDL | 0.06 | parts |
| Diisocyanate - IPDI | 21.11 | parts |

All materials, except the diisocyanate, were added to a dry glass reactor containing a nitrogen atmosphere fitted with mechanical stirrer, water cooled condenser, dropping funnel and thermocouple. The flask contents were heated to 52° C. giving a solution.

Diisocyanate (4.42 parts) was added from the dropping funnel over 5 minutes resulting in an exotherm to 57° C. As the temperature started to drop heating was restarted to raise reaction temperature to 90° C. The remaining diisocyanate (16.69 parts) was fed in over 30 minutes maintaining the temperature at 90 (±2)° C. throughout the feed and for a further 3 hours 2 minutes.

Aqueous ammonia solution (0.88 S.G.) (1.58 parts) was diluted with water (98.42 parts). This ammonia solution was added to the reaction mixture Heating was stopped but stirring was maintained to dissolve/disperse the polymer resulting in a clear yellow liquid with total solids content of 50.4%. This is Dispersant 36.

Example 37

The following reagents were used

| | | |
|---|---|---|
| DMPA | 6.58 | parts |
| CHDM | 5.45 | parts |
| Intermediate 2 | 41.10 | parts |
| MeOPEG750 | 17.80 | parts |
| DBTDL | 0.07 | parts |
| Diisocyanate - IPDI | 29.01 | parts |

All materials, except the diisocyanate, were added to a dry glass reactor containing a nitrogen atmosphere fitted with mechanical stirrer, water cooled condenser, dropping funnel and thermocouple. The flask contents were heated to 52° C. giving a solution.

Diisocyanate (7.08 parts) was added from the dropping funnel over 6 minutes resulting in an exotherm to 56° C. As the temperature started to drop heating was restarted to raise reaction temperature to 90° C. The remaining diisocyanate (21.93 parts) was fed in over 53 minutes maintaining the temperature at 90 (±2)° C. throughout the feed and for a further 3 hours 18 minutes.

N,N-Dimethylethanolamine (4.37 parts) was diluted with water (99.71 parts). This ammonia solution was added to the reaction mixture. Heating was stopped but stirring was maintained to dissolve/disperse the polymer resulting in a clear yellow liquid with total solids content of 49.7%. This is Dispersant 37.

Example 38

The following reagents were used

| | |
|---|---|
| NMP | 34.11 parts |
| EGSSIPA | 14.62 parts |
| Intermediate 1 | 45.69 parts |
| CHDM | 4.16 parts |
| MeOPEG750 | 8.62 parts |
| DBTDL | 0.07 parts |
| Diisocyanate - IPDI | 26.84 parts |

A solution of the EGSSIPA in the NMP together with all the other reagents, except the diisocyanate, were added to a dry glass reactor containing a nitrogen atmosphere fitted with mechanical stirrer, water cooled condenser, dropping funnel and thermocouple. The flask contents were heated to 57° C. giving a solution.

The diisocyanate was added from the dropping funnel over 45 minutes whilst continuing to heat the reaction mixture. The temperature rose during the addition to 89° C. after about 11 minutes. The temperature was maintained at 90 (±2)° C. throughout the remainder of the feed and for a further 3 hours 5 minutes.

Aqueous ammonia solution (0.88 S.G.) (2.00 parts) was diluted with water (58.14 parts). This ammonia solution was added to the reaction mixture. Heating was stopped but stirring was maintained to dissolve/disperse the polymer resulting in a hazy yellow liquid with total solids content of 55.5%. This is Dispersant 38.

Example 39

The following reagents were used

| | |
|---|---|
| NMP | 30.03 parts |
| EGSSIPA | 12.87 parts |
| Intermediate 2 | 40.21 parts |
| CHDM | 2.84 parts |
| MeOPEG750 | 19.57 parts |
| DBTDL | 0.06 parts |
| Diisocyanate - TMXDI | 24.44 parts |

A solution of the EGSSIPA in the NMP together with all the other reagents, except the diisocyanate, were added to a dry glass reactor containing a nitrogen atmosphere fitted with mechanical stirrer, water cooled condenser, dropping funnel and thermocouple. The flask contents were heated to 50° C. giving a solution.

The diisocyanate was added from the dropping funnel over 54 minutes whilst continuing to heat the reaction mixture. The temperature rose during the addition to 90° C. after about 37 minutes. The temperature was maintained at 90-101° C. throughout the remainder of the feed and for a further 3 hours.

Aqueous ammonia solution (0.88 S.G.) (1.86 parts) was diluted with water (58.25 parts). This ammonia solution was added to the reaction mixture. Heating was stopped but stirring was maintained to dissolve/disperse the polymer resulting in a cloudy yellow liquid with total solids content of 56.6%. This is Dispersant 39.

Example 40

The following reagents were used

| | |
|---|---|
| NMP | 29.66 parts |
| EGSSIPA | 12.71 parts |
| Intermediate 2 | 39.72 parts |
| CHDM | 3.59 parts |
| MeOPEG750 | 20.56 parts |
| DBTDL | 0.06 parts |
| Diisocyanate - IPDI | 23.36 parts |

A solution of the EGSSIPA in the NMP together with all the other reagents, except the diisocyanate, were added to a dry glass reactor containing a nitrogen atmosphere fitted with mechanical stirrer, water cooled condenser, dropping funnel and thermocouple. The flask contents were heated to 50° C. giving a solution.

The diisocyanate was added from the dropping funnel over 42 minutes whilst continuing to heat the reaction mixture. The temperature rose during the addition to 90° C. after about 17 minutes. The temperature was maintained at 90 (±2)° C. throughout the remainder of the feed and for a further 3 hours 4 minutes.

Aqueous ammonia solution (0.88 S.G.) (1.84 parts) was diluted with water (58.12 parts). This ammonia solution was added to the reaction mixture. Heating was stopped but stirring was maintained to dissolve/disperse the polymer resulting in a hazy yellow liquid with total solids content of 59.0%. This is Dispersant 40.

Example 41

The following reagents were used

| | |
|---|---|
| NMP | 29.45 parts |
| EGSSIPA | 12.62 parts |
| Intermediate 1 | 39.45 parts |
| CHDM | 2.79 parts |
| MeOPEG750 | 21.10 parts |
| DBTDL | 0.06 parts |
| Diisocyanate - IPDI | 23.97 parts |

A solution of the EGSSIPA in the NMP together with all the other reagents, except the diisocyanate, were added to a dry glass reactor containing a nitrogen atmosphere fitted with mechanical stirrer, water cooled condenser, dropping funnel and thermocouple. The flask contents were heated to 51° C. giving a solution.

The diisocyanate was added from the dropping funnel over 50 minutes whilst continuing to heat the reaction mixture. The temperature rose during the addition to 92° C. after about 29 minutes. The temperature was maintained at 90 (±2)° C. throughout the remainder of the feed and for a further 3 hours 4 minutes.

Aqueous ammonia solution (0.88 S.G.) (1.83 parts) was diluted with water (58.06 parts). This ammonia solution was added to the reaction mixture. Heating was stopped but stirring was maintained to dissolve/disperse the polymer resulting in a hazy yellow liquid with total solids content of 55.4%. This is Dispersant 41.

Example 42

The following reagents were used

| | |
|---|---|
| NMP | 20.28 parts |
| EGSSIPA | 8.69 parts |
| Intermediate 9 | 27.17 parts |
| 1,6-hexanediol | 2.77 parts |
| MeOPEG1100 | 45.66 parts |
| DBTDL | 0.04 parts |
| Diisocyanate - TDI | 15.66 parts |

A solution of the EGSSIPA in the NMP together with all the other reagents, except the diisocyanate, were added to a dry glass reactor containing a nitrogen atmosphere fitted with mechanical stirrer, water cooled condenser, dropping funnel and thermocouple. The flask contents were heated to 51° C. giving a solution.

Diisocyanate (3.72 parts) was added from the dropping funnel over 5 minutes resulting in an exotherm to 61° C. As the temperature started to drop heating was restarted to raise reaction temperature to 90° C. The remaining diisocyanate (11.94 parts) was fed in over 42 minutes maintaining the temperature at 90 (±4)° C. throughout the feed and for a further 3 hours.

Aqueous ammonia solution (0.88 S.G.) (1.19 parts) was diluted with water (78.53 parts). This ammonia solution was added to the reaction mixture. Heating was stopped but stirring was maintained to dissolve/disperse the polymer resulting in a hazy yellow liquid with total solids content of 52.5%. This is Dispersant 42.

Example 43

The following reagents were used

| | |
|---|---|
| NMP | 16.38 parts |
| ITC1081 | 16.38 parts |
| Intermediate 2 | 40.94 parts |
| CHDM | 3.90 parts |
| MeOPEG750 | 18.12 parts |
| DBTDL | 0.07 parts |
| Diisocyanate - IPDI | 20.59 parts |

A solution of the ITC1081 in the NMP together with all the other reagents, except the diisocyanate, were added to a dry glass reactor containing a nitrogen atmosphere fitted with mechanical stirrer, water cooled condenser, dropping funnel and thermocouple. The flask contents were heated to 57° C. giving a solution.

The diisocyanate was added from the dropping funnel over 42 minutes whilst continuing to heat the reaction mixture. The temperature rose during the addition to 91° C. after about 22 minutes. The temperature was maintained at 90 (±2)° C. throughout the remainder of the feed and for a further 5 hours 49 minutes.

Aqueous ammonia solution (0.88 S.G.) (1.10 parts) was diluted with water (76.83 parts). This ammonia solution was added to the reaction mixture. Heating was stopped but stirring was maintained to dissolve/disperse the polymer resulting in a hazy yellow liquid with total solids content of 50.1%. This is Dispersant 43.

Example 44

The following reagents were used

| | |
|---|---|
| MDA | 5.38 parts |
| Intermediate 2 | 37.86 parts |
| CHDM | 4.82 parts |
| MeOPEG750 | 24.29 parts |
| DBTDL | 0.06 parts |
| Diisocyanate - IPDI | 36.44 parts |

All materials, except the diisocyanate, were added to a dry glass reactor containing a nitrogen atmosphere fitted with mechanical stirrer, water cooled condenser, dropping funnel and thermocouple. The flask contents were heated to 49° C. giving a solution.

The diisocyanate was added from the dropping funnel over 56 minutes whilst continuing to heat the reaction mixture. The temperature rose during the addition to 90° C. when addition was complete. The temperature was maintained at 90 (±2)° C. for a further 3 hours 13 minutes.

Water (97.8 parts) was added to the reaction mixture. Heating was stopped but stirring was maintained to dissolve/disperse the polymer resulting in a hazy yellow liquid with total solids content of 50.6%. This is Dispersant 44.

Example 45

The following reagents were added to a dry glass reactor containing a nitrogen atmosphere fitted with mechanical stirrer, water cooled condenser, dropping funnel and thermocouple.

| | |
|---|---|
| DMPA | 6.91 parts |
| CHDM | 5.22 parts |
| Intermediate 2 | 43.18 parts |
| DBTDL | 0.07 parts |
| MeOPEG750 | 13.63 parts |

The reactants were heated to 50° C. giving a solution, IPDI (7.44 parts) was then added over 4 minutes and the temperature rose to a maximum 56° C. After stirring for a further 6 mins the temperature was then raised to 90° C. and IPDI (23.54 parts) was added over 33 mins. The reactants were then stirred at 90-95° C. for a further 191 mins under nitrogen. Heating was removed. A solution of water (97.06 parts), aqueous ammonia solution (0.88 S.G.) (2.50 parts) and hydrazine hydrate (0.44 parts) were added to the hot mixture to give a clear yellow solution with a total solids content of 51.1%. This is Dispersant 45.

Preparation of Pigment Dispersions

Raven 5000, a high surface area carbon black pigment, has been used. Aqueous dispersions were prepared with either 22.2 wt % or 27 wt % pigment loadings. Dispersant loadings were about 70% by weight of active material based on weight of pigment.

The dispersions were prepared by adding the materials detailed in the Table 1 below to a 4 oz glass jar in the order listed. The mixture was gently stirred to wet out the pigment.

125 g of 3 mm diameter glass beads were added to the jar. The jar was placed in a Scandex disperser model 200-K and the contents milled by oscillatory shaking for 4 hours.

TABLE 1

|  | Dispersion 1 | Dispersion A | Dispersion 2 | Dispersion 3 | Dispersion B |
|---|---|---|---|---|---|
| Water | 15.51 | 15.51 | 11.34 | 11.34 | 11.52 |
| Dispersant 1 | 10.63 | — | — | — | — |
| Dispersant A | — | 10.63 | — | — | — |
| Dispersant 2 | — | — | 13.17 | — | — |
| Dispersant 3 | — | — | — | 13.17 | — |
| Dispersant B | — | — | — | — | 12.99 |
| Proxel GXL | 0.06 | 0.06 | 0.06 | 0.06 | 0.06 |
| BYK 024 | 0.36 | 0.36 | 0.36 | 0.36 | 0.36 |
| Raven 5000 Ultra | 7.59 | 7.59 | 9.22 | 9.22 | 9.22 |
| TOTAL | 34.15 | 34.15 | 34.15 | 34.15 | 34.15 |
| % Pigment | 22.22 | 22.22 | 27.00 | 27.00 | 27.00 |

Footnote to Table 1:
Proxel GXL is biocide ex Avecia Ltd
Byk 024 is antifoam agent ex Byk-Chemie Further dispersions were prepared in similar manner to Dispersion 2 using Dispersants 4 to 45 except using about 11.6 parts water and about 12.91 parts dispersant such that the actual active mass of dispersant was 6.454 parts and the total amount of dispersion was 34.15 parts.

Viscosity of Dispersions

The viscosity of the dispersions prepared were measured on TA instruments rheometer with cone and plate geometry over a range of shear rates. The viscosity data are shown in Table 2.

TABLE 2

| Shear rate/s$^{-1}$ | 38 | 102 | 176 | 297 | 491 | 837 | 1408 | 2392 |
|---|---|---|---|---|---|---|---|---|
| Dispersion 1 | N/A | 0.116 | 0.109 | 0.095 | 0.092 | 0.079 | 0.071 | 0.067 |
| Dispersion A | 0.601 | 0.410 | 0.327 | 0.260 | 0.190 | 0.145 | 0.103 | 0.081 |
| Dispersion 2 | 0.611 | 0.566 | 0.498 | 0.451 | 0.386 | 0.328 | 0.263 | 0.217 |
| Dispersion 3 | N/A | 0.168 | 0.145 | 0.131 | 0.126 | 0.118 | 0.108 | 0.107 |
| Dispersion B | 7.498 | 5.084 | 3.974 | 2.949 | 2.176 | 1.594 | 1.101 | 0.782 |
| Dispersion 4 | 0.316 | 0.149 | 0.146 | 0.127 | 0.128 | 0.123 | 0.116 | 0.102 |
| Dispersion 5 | 6.983 | 3.545 | 2.382 | 1.661 | 1.123 | 0.794 | 0.548 | 0.388 |
| Dispersion 6 | 0.580 | 0.527 | 0.388 | 0.349 | 0.275 | 0.245 | 0.200 | 0.174 |
| Dispersion 7 | 1.689 | 1.228 | 0.955 | 0.800 | 0.619 | 0.509 | 0.396 | 0.319 |
| Dispersion 8 | 0.870 | 0.809 | 0.668 | 0.587 | 0.478 | 0.410 | 0.347 | 0.296 |
| Dispersion 9 | 4.984 | 2.867 | 1.942 | 1.431 | 0.969 | 0.693 | 0.476 | 0.353 |
| Dispersion 10 | — | 0.249 | 0.146 | 0.145 | 0.111 | 0.105 | 0.097 | 0.098 |
| Dispersion 11 | — | 0.246 | 0.173 | 0.178 | 0.137 | 0.127 | 0.116 | 0.115 |
| Dispersion 12 | 0.510 | 0.458 | 0.315 | 0.288 | 0.224 | 0.200 | 0.156 | 0.132 |
| Dispersion 13 | — | 0.159 | 0.119 | 0.125 | 0.123 | 0.119 | 0.112 | 0.108 |
| Dispersion 14 | 0.467 | 0.309 | 0.245 | 0.233 | 0.196 | 0.168 | 0.143 | 0.115 |
| Dispersion 15 | 0.965 | 0.616 | 0.519 | 0.450 | 0.383 | 0.336 | 0.277 | 0.234 |
| Dispersion 16 | 0.818 | 0.491 | 0.429 | 0.378 | 0.317 | 0.268 | 0.217 | 0.180 |
| Dispersion 17 | 5.680 | 3.031 | 2.093 | 1.513 | 1.055 | 0.761 | 0.532 | 0.390 |
| Dispersion 18 | 0.392 | 0.326 | 0.304 | 0.296 | 0.269 | 0.244 | 0.214 | 0.188 |
| Dispersion 19 | 0.429 | 0.308 | 0.282 | 0.270 | 0.238 | 0.207 | 0.178 | 0.155 |
| Dispersion 20 | — | 0.130 | 0.133 | 0.145 | 0.142 | 0.138 | 0.135 | 0.134 |
| Dispersion 21 | 0.425 | 0.263 | 0.232 | 0.230 | 0.206 | 0.189 | 0.162 | 0.139 |
| Dispersion 22 | 0.393 | 0.185 | 0.201 | 0.199 | 0.186 | 0.176 | 0.161 | 0.145 |
| Dispersion 23 | No data not tested | | | | | | | |
| Dispersion 24 | 0.976 | 0.783 | 0.679 | 0.611 | 0.519 | 0.445 | 0.370 | 0.307 |
| Dispersion 25 | 0.405 | 0.279 | 0.257 | 0.227 | 0.206 | 0.186 | 0.161 | 0.149 |
| Dispersion 26 | 1.005 | 0.830 | 0.735 | 0.633 | 0.534 | 0.450 | 0.366 | 0.308 |
| Dispersion 27 | 0.611 | 0.566 | 0.498 | 0.451 | 0.386 | 0.328 | 0.263 | 0.217 |
| Dispersion 28 | 0.537 | 0.462 | 0.429 | 0.389 | 0.343 | 0.304 | 0.254 | 0.219 |
| Dispersion 29 | | 0.000 | 0.119 | 0.128 | 0.128 | 0.118 | 0.110 | 0.106 |
| Dispersion 30 | | 0.223 | 0.136 | 0.138 | 0.098 | 0.098 | 0.088 | 0.085 |
| Dispersion 31 | 1.290 | 1.010 | 0.787 | 0.673 | 0.515 | 0.431 | 0.339 | 0.281 |
| Dispersion 32 | 0.925 | 0.730 | 0.627 | 0.542 | 0.449 | 0.364 | 0.283 | 0.255 |
| Dispersion 33 | 0.534 | 0.413 | 0.380 | 0.342 | 0.293 | 0.260 | 0.213 | 0.182 |

TABLE 2-continued

| Shear rate/s$^{-1}$ | 38 | 102 | 176 | 297 | 491 | 837 | 1408 | 2392 |
|---|---|---|---|---|---|---|---|---|
| Dispersion 34 | | 0.164 | 0.155 | 0.153 | 0.158 | 0.154 | 0.146 | 0.131 |
| Dispersion 35 | 1.092 | 0.913 | 0.698 | 0.576 | 0.427 | 0.338 | 0.256 | 0.206 |
| Dispersion 36 | 0.296 | 0.447 | 0.329 | 0.315 | 0.254 | 0.229 | 0.198 | 0.180 |
| Dispersion 37 | 0.312 | 0.287 | 0.249 | 0.237 | 0.221 | 0.201 | 0.178 | 0.162 |
| Dispersion 38 | 0.704 | 0.456 | 0.384 | 0.339 | 0.291 | 0.258 | 0.217 | 0.188 |
| Dispersion 39 | 2.521 | 1.619 | 1.229 | 0.944 | 0.714 | 0.552 | 0.415 | 0.333 |
| Dispersion 40 | 0.359 | 0.147 | 0.134 | 0.142 | 0.135 | 0.131 | 0.119 | 0.111 |
| Dispersion 41 | | 0.130 | 0.133 | 0.143 | 0.141 | 0.137 | 0.127 | 0.122 |
| Dispersion 42 | | 0.125 | 0.134 | 0.147 | 0.144 | 0.142 | 0.134 | 0.121 |
| Dispersion 43 | 5.040 | 2.409 | 1.613 | 1.125 | 0.763 | 0.543 | 0.378 | 0.277 |
| Dispersion 44 | | 0.130 | 0.086 | 0.109 | 0.107 | 0.115 | 0.116 | 0.112 |
| Dispersion 45 | 0.506 | 0.405 | 0.370 | 0.344 | 0.304 | 0.270 | 0.236 | 0.201 |

Preparation of Acrylic Coating Formulation 2.75 parts of aqueous acrylic latex binder resin (Setalux 6801 AQ-24 ex Akzo Nobel) was added to 1 part of dispersion with stirring by hand. A further 5 parts of the latex were added with stirring to form a paint.

The resulting paints were drawn down onto Leneta black and white card using an automatic film applicator fitted with a number 4 K bar. The coating was air dried overnight and cured for 10 minutes in an oven at 100° C. The gloss and haze of the coating were measured with a gloss and haze meter. Jetness was determined by visual inspection under halogen light with comparison against a control panel. The results are given in Table 3 below wherein Paint 1 contains Dispersant 1, Paint 2 contains Dispersant 2 and so on.

TABLE 3

|  | Gloss 60° | Gloss 20° | Haze | Jetness (Halogen) |
|---|---|---|---|---|
| Acrylic Paint 1 | 83.0 | 43.0 | 423 | 3 |
| Acrylic Paint A | 61.3 | 20.7 | 379 | 4-5 |
| Acrylic Paint 2 | 85.7 | 46.7 | 378 | 1-2 |
| Acrylic Paint 3 | 88.6 | 50.5 | 389 | 1-2 |
| Acrylic Paint B | 73.7 | 30.1 | 393 | 3 |
| Acrylic Paint 4 | 81.7 | 41.2 | 414 | 4 |
| Acrylic Paint 5 | 62.1 | 20.9 | 361 | 5 |
| Acrylic Paint 6 | 79.6 | 37.7 | 426 | 2-3 |
| Acrylic Paint 7 | 78.4 | 33.4 | 444 | 2-3 |
| Acrylic Paint 8 | 75.9 | 31.8 | 421 | 5 |
| Acrylic Paint 9 | 80.8 | 39.1 | 413 | 2-3 |
| Acrylic Paint 10 | 90.0 | 52.6 | 334 | 5 |
| Acrylic Paint 11 | 53.3 | 14.4 | 341 | 4 |
| Acrylic Paint 12 | 59.0 | 18.1 | 363 | 4-5 |
| Acrylic Paint 13 | 85.7 | 48.6 | 343.0 | 5 |
| Acrylic Paint 14 | 74.4 | 30.0 | 325 | 5 |
| Acrylic Paint 15 | 80.1 | 36.1 | 437 | 1-2 |
| Acrylic Paint 16 | 64.6 | 21.2 | 398 | 1-2 |
| Acrylic Paint 17 | 41.0 | 7.1 | 268 | 5 |
| Acrylic Paint 18 | 70.2 | 24.3 | 425 | 2 |
| Acrylic Paint 19 | 63.4 | 22.6 | 386 | 2 |
| Acrylic Paint 20 | 58.8 | 17.1 | 383 | 2 |
| Acrylic Paint 21 | 80.8 | 38.5 | 425 | 1 |
| Acrylic Paint 22 | 86.5 | 49.9 | 374 | 1 |
| Acrylic Paint 23 | | | | |
| Acrylic Paint 24 | 84.0 | 46.8 | 380 | 1-2 |
| Acrylic Paint 25 | 87.5 | 53.8 | 336 | 1-2 |
| Acrylic Paint 26 | 82.7 | 42.8 | 372.0 | 1-2 |
| Acrylic Paint 27 | 85.7 | 46.7 | 378 | 1-2 |
| Acrylic Paint 28 | 85.3 | 47.9 | 346 | 1-2 |
| Acrylic Paint 29 | 86.8 | 49.3 | 362.0 | 1-2 |
| Acrylic Paint 30 | 87.3 | 50.6 | 408 | 3-4 |
| Acrylic Paint 31 | 84.0 | 47.1 | 368 | 4 |
| Acrylic Paint 32 | 88.3 | 55.4 | 327 | 2 |
| Acrylic Paint 33 | 87.9 | 56.1 | 294 | 2 |
| Acrylic Paint 34 | 74.0 | 29.6 | 425 | 1 |
| Acrylic Paint 35 | 53.6 | 11.1 | 292 | 4 |
| Acrylic Paint 36 | 82.4 | 26.3 | 344 | 4 |
| Acrylic Paint 37 | 82.0 | 38.2 | 400 | 1-2 |

TABLE 3-continued

|  | Gloss 60° | Gloss 20° | Haze | Jetness (Halogen) |
|---|---|---|---|---|
| Acrylic Paint 38 | 84.7 | 48.0 | 388 | 4 |
| Acrylic Paint 39 | 83.3 | 35.2 | 392 | 2 |
| Acrylic Paint 40 | 84.8 | 42.8 | 435 | 1 |
| Acrylic Paint 41 | 85.6 | 52.6 | 351 | 5 |
| Acrylic Paint 42 | 86.5 | 49.6 | 405 | 5 |
| Acrylic Paint 43 | 49.5 | 13.4 | 317 | 2-3 |
| Acrylic Paint 44 | 11.8 | 1.1 | 91.1 | 5 |
| Acrylic Paint 45 | 82.2 | 40.9 | 410 | 2-3 |

Footnote to Table 3:
Jetness results are from visual inspection with 1 = excellent and 5 = poor Preparation of Polyurethane Coating Formulation These were prepared in similar manner to the Acrylic coatings above using a mixture of 6.9 parts aqueous polyurethane binder resin (Bayhydrol VP LS 2952 ex Bayer) and 0.85 parts melamine-formaldehyde resin (Cymel 325 ex Dyno-Cytec). The resulting gloss, haze and jetness are given in Table 4 below for paints 4 to 45 (Dispersants 2 to 45 respectively).

TABLE 4

|  | Gloss 60° | Gloss 20° | Haze | Halogen/ jetness |
|---|---|---|---|---|
| Polyurethane paint 2 | 85.5 | 54.0 | 170 | 1-2 |
| Polyurethane paint 3 | 85.8 | 54.3 | 339 | 1-2 |
| Polyurethane paint 4 | 87.5 | 60.8 | 282 | 2 |
| Polyurethane paint 5 | 80.3 | 42.5 | 373 | 2-3 |
| Polyurethane paint 6 | 86.9 | 60.1 | 256 | 3-4 |
| Polyurethane paint 7 | 85.7 | 57.7 | 276 | 3 |
| Polyurethane paint 8 | 86.1 | 50.2 | 393 | 2 |
| Polyurethane paint 9 | 85.9 | 57.6 | 289 | 5 |
| Polyurethane paint 10 | 90.2 | 63.9 | 267 | 2 |
| Polyurethane paint 11 | 88.5 | 60.1 | 288 | 2-3 |
| Polyurethane paint 12 | 59.0 | 18.1 | 363 | 4-5 |
| Polyurethane paint 13 | 90.0 | 64.0 | 281 | 3 |
| Polyurethane paint 14 | 86.7 | 52.8 | 383 | 1-2 |
| Polyurethane paint 15 | 87.0 | 60.1 | 266 | 1-2 |
| Polyurethane paint 16 | 87.3 | 58.6 | 297 | 1-2 |
| Polyurethane paint 17 | 77.9 | 39.8 | 367 | 4 |
| Polyurethane paint 18 | 88.1 | 51.5 | 384 | 3-4 |
| Polyurethane paint 19 | 90.2 | 53.9 | 390 | 3 |
| Polyurethane paint 20 | 89.5 | 60.0 | 321 | 1-2 |
| Polyurethane paint 21 | 88.3 | 62.7 | 277 | 1 |
| Polyurethane paint 22 | 88.5 | 62.3 | 266 | 1 |
| Polyurethane paint 23 |  |  |  |  |
| Polyurethane paint 24 | 85.9 | 48.0 | 387 | 1-2 |
| Polyurethane paint 25 | 86.6 | 50.6 | 328 | 1-2 |
| Polyurethane paint 26 | 85.4 | 44.8 | 406.0 | 1-2 |
| Polyurethane paint 27 | 85.5 | 54.0 | 170 | 1-2 |
| Polyurethane paint 28 | 85.1 | 52.8 | 328 | 2 |
| Polyurethane paint 29 | 89.2 | 51.2 | 404.0 | 1-2 |
| Polyurethane paint 30 | 87.9 | 61.6 | 292 | 1 |
| Polyurethane paint 31 | 84.5 | 53.5 | 316 | 4 |
| Polyurethane paint 32 | 86.2 | 64.0 | 179 | 1-2 |
| Polyurethane paint 33 | 86.9 | 63.8 | 217 | 1-2 |
| Polyurethane paint 34 | 87.0 | 55.2 | 347 | 2 |
| Polyurethane paint 35 | 86.2 | 63.5 | 206 | 3 |
| Polyurethane paint 36 | 88.1 | 63.8 | 238 | 2 |
| Polyurethane paint 37 | 87.7 | 45.3 | 418 | 1-2 |
| Polyurethane paint 38 | 89.4 | 58.7 | 331 | 1 |
| Polyurethane paint 39 | 87.3 | 46.5 | 347 | 1-2 |
| Polyurethane paint 40 | 89.6 | 61.5 | 301 | 1 |
| Polyurethane paint 41 | 89.5 | 63.1 | 304 | 1 |
| Polyurethane paint 42 | 88.2 | 59.6 | 314 | 4-5 |
| Polyurethane paint 43 | 89.0 | 52.8 | 389 | 2-3 |
| Polyurethane paint 44 | 89.5 | 60.4 | 294 | 1-2 |
| Polyurethane paint 45 | 87.2 | 56.5 | 328 | 1-2 |

Jetness results are from visual inspection with 1 = excellent and 5 = poor

Preparation of Ink Jet Ink Formulation

Pigment Red 122 (Monolite Rubine 3B from Avecia) was milled in a Blackley mill (i.e. a vertical sand or media mill) for 5 hrs at 2300 rpm, or 7 meters per second tip speed, using Zirconia beads 0.6-0.8 mm. Bead milling was done in water at a concentration of 15 wt % pigment and 4.5 wt % of active dispersant (ie 30 wt % of dispersant based on pigment). Small aliquots of TEGO Foamex 810 (antifoam agent) were added as required. The total was made up to 100% with water.

Particle size of the dispersions was then measured using a Malvern Zetasizer 3000HS. The results are given in Table 5 below, where Dispersion 15 contains Dispersant 15 and so on.

TABLE 5

|  | Particle size/nm |
|---|---|
| Red dispersion 15 | 151 |
| Red dispersion 16 | 134 |
| Red dispersion 22 | 143 |
| Red dispersion 26 | 157 |

The four red dispersions were then used to make inks by mixing the following components.

| Red dispersion | 40 parts |
|---|---|
| Alkali soluble acrylic copolymer solution 25 wt % solids in water | 16 parts |
| Glycerol | 10 parts |
| Pentanediol | 5 parts |
| Surfynol 465 | 0.5 parts |
| Water | 28.5 parts |

Each of the ink formulations was then printed through an Epson 980 printer onto plain paper. The print performance and print quality were excellent for each of the inks.

The invention claimed is:

1. A polyurethane polymer comprising from 35% to 90% by weight of a poly ($C_{2-4}$-alkylene oxide) based on the total weight of the polyurethane polymer wherein not less than 60% by weight of the total poly ($C_{2-4}$-alkylene oxide) is poly (ethylene oxide) and wherein at least 5% poly ($C_{2-4}$-alkylene oxide) based on the total weight of the polyurethane polymer is incorporated in lateral chains, which lateral chains are characterized as poly($C_{2-4}$-alkylene oxide) chains with at least two groups, which react with isocyanates, which are located at the one end of the chain such that said chains are laterally disposed in relation to the polyurethane polymer backbone, wherein said polyurethane polymer has a number average molecular weight of not less than 2,000 and not greater than 50,000 g/mole and which polyurethane polymer contains from 10 to 180 milli-equivalents of acid groups for each 100 gm polyurethane when the polyurethane polymer contains from 35 to 45% by weight poly (alkylene oxide).

2. A polyurethane polymer as claimed in claim 1 wherein poly ($C_{2-4}$-alkylene oxide) is located in lateral or terminal, if present chains and the amount of poly(ethylene oxide) is not less than 80% by weight of the poly ($C_{2-4}$-alkylene oxide) located in lateral or terminal, if present, chains.

3. A polyurethane polymer as claimed in claim 2 wherein the amount of poly ($C_{2-4}$-alkylene oxide) is not less than 50% and not greater than 70% based on the total weight of the polymer.

4. A polyurethane polymer as in claim 2, further optionally comprising terminally attached poly(alkylene oxide) chains, wherein the number average molecular weight of the poly (alkylene oxide) chains which are attached laterally or terminally to the polyurethane backbone is from 350 to 2,500 g/mole.

5. A polyurethane polymer as in claim 2 which contains not less than 20 and not greater than 60 milliequivalents of acid groups for each 100 gm of the polyurethane polymer and wherein at least 10% by weight of the poly(alkylene oxide) is located in lateral chains.

6. A polyurethane polymer comprising from 35% to 90% by weight of a poly ($C_{2-4}$-alkylene oxide) based on the total weight of the polyurethane polymer wherein not less than 60% by weight of the total poly ($C_{2-4}$-alkylene oxide) is poly (ethylene oxide) and wherein at least 5% poly ($C_{2-4}$-alkylene oxide) based on the total weight of the polyurethane polymer is incorporated in lateral chains, which lateral chains are characterized as poly($C_{2-4}$-alkylene oxide) chains with at least two groups, which react with isocyanates, which are located at the one end of the chain such that said chains are laterally disposed in relation to the polyurethane polymer backbone, wherein said polyurethane polymer has a number average molecular weight of not less than 2,000 and not greater than 50,000 g/mole which is obtained by reacting together:

a) one or more polyisocyanates having an average functionality of from 2.0 to 2.5;
   b) one or more compounds having at least one ($C_{2-4}$-alkylene oxide) chain and at least two groups, which react with isocyanates, which are located at the one end of the compound such that the poly (C2-4-alkylene oxide) chain is laterally disposed relative to the polyurethane polymer backbone;
   c) optionally, one or more compounds having at least one acid group and at least two groups which react with isocyanates;
   d) optionally, one or more formative compounds having a number average molecular weight of from 32 to 3,000 g/mole which have at least two groups which react with isocyanates;
   e) optionally, one or more compounds which act as chain terminators which contain one group which reacts with isocyanate groups; and
   f) optionally, one or more compounds which act as chain terminators which contain a single isocyanate group wherein component (b) is selected from the group consisting of compound of formula 1, 2, 3, 4, and 6

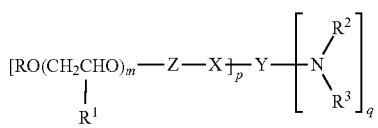

wherein
   R is $C_{1-20}$-hydrocarbyl;
   $R^1$ is hydrogen, methyl or ethyl of which not less than 60% is hydrogen;
   $R^2$ and $R^3$ are each, independently, $C_{1-8}$-hydroxy alkyl;
   Z is $C_{2-4}$-alkylene;
   X is —O— or —NH—;
   Y is the residue of a polyisocyanate;
   m is from 5 to 150;
   p is from 1 to 4; and
   q is 1 or 2

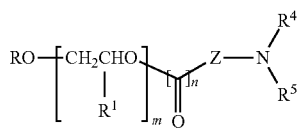

wherein
   $R^4$ is an isocyanate-reactive organic radical;
   $R^5$ is hydrogen or an isocyanate-reactive radical; and
   n is 0 or 1

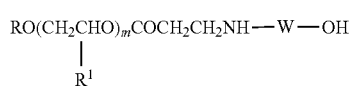

wherein
   W is $C_{2-6}$-alkylene

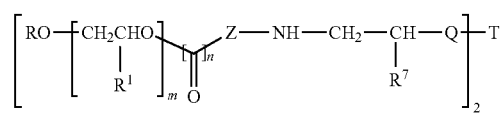

wherein
   $R^7$ is hydrogen, halogen or $C_{1-4}$ alkyl;
   Q is a divalent electron withdrawing group;
   T is a divalent hydrocarbon radical which may contain heteroatoms;

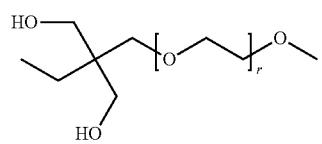

wherein
   r is from 4 to 100.

7. A polyurethane as claimed in claim 6 wherein component (a) is a diisocyanate.

8. A polyurethane as claimed in claim 6 wherein component (b) is a compound of formula 1

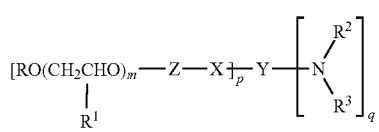

wherein
   R is $C_{1-20}$-hydrocarbyl;
   $R^1$ is hydrogen, methyl or ethyl of which not less than 60% is hydrogen;

$R^2$ and $R^3$ are each, independently, $C_{1-8}$-hydroxy alkyl;
Z is $C_{2-4}$-alkylene;
X is —O— or —NH—;
Y is the residue of a polyisocyanate;
m is from 5 to 150;
p is from 1 to 4; and
q is 1 or 2.

9. A polyurethane as claimed in claim 8 wherein Z is ethylene,
$R^1$ is hydrogen and X is
—O— and p and q are both 1.

10. A polyurethane as claimed in claim 8, wherein $R^2$ and $R^3$ are both hydroxyethyl.

11. A polymer as claimed in claim 6 wherein component (b) is a compound of formula 2

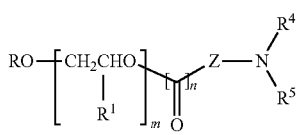

wherein
R is $C_{1-20}$-hydrocarbyl;
$R^1$ is hydrogen, methyl or ethyl of which not less than 60% is hydrogen;
Z is $C_{2-4}$-alkylene;
m is from 5 to 150;
$R^4$ is an isocyanate-reactive organic radical;
$R^5$ is hydrogen or an isocyanate-reactive radical; and
n is 0 or 1.

12. A polyurethane as claimed in claim 11 wherein n is zero, Z is 1,2-propylene, $R^4$ is 2-hydroxyethyl and $R^5$ is hydrogen.

13. A polyurethane as claimed in claim 11 wherein n is zero, Z is 1,2-propylene and $R^4$ and $R^5$ are both 2-hydroxyethyl.

14. A polyurethane as claimed in claim 6 wherein component (b) is a compound of formula 3

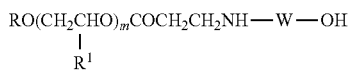

wherein
R is $C_{1-20}$-hydrocarbyl;
$R^1$ is hydrogen, methyl or ethyl of which not less than 60% is hydrogen;
m is from 5 to 150; and
W is $C_{2-6}$-alkylene.

15. A polyurethane as claimed in claim 6 wherein component (b) is a compound of formula 4

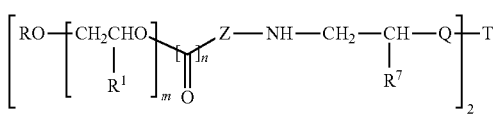

wherein
R is $C_{1-20}$-hydrocarbyl;
$R^1$ is hydrogen, methyl or ethyl of which not less than 60% is hydrogen;
Z is $C_{2-4}$-alkylene;
$R^7$ is hydrogen, halogen or $C_{1-4}$ alkyl;
Q is a divalent electron withdrawing group;
T is a divalent hydrocarbon radical which may contain heteroatoms; and
n is 0 or 1.

16. A polyurethane as claimed in claim 15 wherein component (b) is obtained by reacting two moles of a poly (alkylene oxide) monoalkyl ether monoamine with one mole of a compound of formula 5

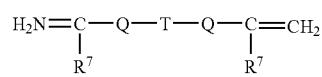

wherein
R', Q and T are as defined in claim 15.

17. A polyurethane as claimed in claim 6 wherein component (b) is a compound of formula 6

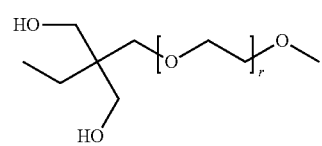

wherein
r is from 4 to 100.

18. A polyurethane as claimed in claim 6 wherein component (c) is a compound of formula 7

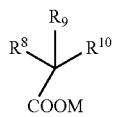

wherein, at least two of the groups $R^8$, $R^9$ and $R^{10}$ are $C_{1-6}$-hydroxy alkyl and the remainder is $C_{1-6}$-hydrocarbyl and M is hydrogen, an alkali metal cation, ammonium or quaternary ammonium cation.

19. A polyurethane polymer as claimed claim 1 wherein the number average molecular weight is not less than 2,000 and not greater than 20,000 g/mole.

20. A dispersion comprising a particulate solid, a polar liquid and a polyurethane polymer as claimed in claim 2 used as a dispersant for said particulate solid.

21. A millbase comprising a particulate solid, a polar liquid, a film-forming resin and a polyurethane polymer as claimed in claim 2 used as a dispersant for said particulate solid.

22. A composition comprising a particulate solid and a polyurethane polymer as claimed in claim 2 used as a dispersant for said particulate solid.

23. A paint or ink comprising a particulate solid, a polar liquid, a film-forming resin and a polyurethane polymer as claimed in claim 2 used as a dispersant for said particulate solid.

24. An ink jet printing ink comprising a pigment, a polar liquid and a dispersant which is a polyurethane as claimed in claim 2 used as a dispersant for said particulate solid.

* * * * *